(12) United States Patent
Alonzo et al.

(10) Patent No.: US 11,858,351 B2
(45) Date of Patent: Jan. 2, 2024

(54) COLD-FORMED GLASS ARTICLE WITH THERMALLY MATCHED SYSTEM AND PROCESS FOR FORMING THE SAME

(71) Applicant: CORNING INCORPORATED, Corning, NY (US)

(72) Inventors: Carlos Francis Alonzo, Corning, NY (US); Atul Kumar, Horseheads, NY (US); Jinfa Mou, Pittsford, NY (US); Christopher Mark Schweiger, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 130 days.

(21) Appl. No.: 17/296,835

(22) PCT Filed: Nov. 19, 2019

(86) PCT No.: PCT/US2019/062141
§ 371 (c)(1),
(2) Date: May 25, 2021

(87) PCT Pub. No.: WO2020/112435
PCT Pub. Date: Jun. 4, 2020

(65) Prior Publication Data
US 2022/0024179 A1    Jan. 27, 2022

Related U.S. Application Data

(60) Provisional application No. 62/773,505, filed on Nov. 30, 2018, provisional application No. 62/773,497, filed on Nov. 30, 2018.

(51) Int. Cl.
*B60K 37/02* (2006.01)
*B32B 17/10* (2006.01)
(Continued)

(52) U.S. Cl.
CPC .............. *B60K 37/02* (2013.01); *B32B 7/027* (2019.01); *B32B 7/12* (2013.01); *B32B 17/061* (2013.01);
(Continued)

(58) Field of Classification Search
CPC ......... B32B 7/027; B32B 7/12; B32B 17/061; B32B 37/12; B32B 2457/20; B60K 2370/152
See application file for complete search history.

(56) References Cited

U.S. PATENT DOCUMENTS 4,455,338 A   6/1984  Henne
4,899,507 A   2/1990  Mairlot
(Continued)

FOREIGN PATENT DOCUMENTS

CN   102566841 A   7/2012
CN   203825589 U   9/2014
(Continued)

OTHER PUBLICATIONS

International Search Report and Written Opinion of the International Searching Authority; PCT/US2019/062141; dated Feb. 3, 2020; 14 pages; European Patent Office.
(Continued)

*Primary Examiner* — Michael Zhang

(57) ABSTRACT

A glass article is provided with a cover glass sheet having first and second major surfaces. The second major surface has a first region with a first curve of a first radius of curvature, and a second region that is different than the first region. A frame's support surface has a third region of a first frame material and a fourth region of a different, second frame material. The second major surface faces the support, and the third region includes a second curve that complements the first curve while the fourth region complements
(Continued)

the second region. A first adhesive is between the third region and the first region. A second adhesive is disposed between the fourth region and the second region. The first adhesive has a first Young's modulus, and the second adhesive comprising a second Young's modulus that is different than the first Young's modulus.

14 Claims, 8 Drawing Sheets

(51) Int. Cl.
 B32B 7/027 (2019.01)
 B32B 7/12 (2006.01)
 B32B 17/06 (2006.01)
 B32B 37/12 (2006.01)
 B32B 37/02 (2006.01)
(52) U.S. Cl.
 CPC .............. *B32B 17/10* (2013.01); *B32B 37/02* (2013.01); *B32B 2457/20* (2013.01); *B60K 2370/152* (2019.05)

(56) References Cited

U.S. PATENT DOCUMENTS

| | | |
|---|---|---|
| 4,985,099 A | 1/1991 | Mertens et al. |
| 6,086,983 A | 7/2000 | Yoshizawa |
| 6,332,690 B1 | 12/2001 | Murofushi |
| 6,582,799 B1 | 6/2003 | Brown et al. |
| 7,375,782 B2 | 5/2008 | Yamazaki et al. |
| 8,344,369 B2 | 1/2013 | Yamazaki et al. |
| 8,549,885 B2 | 10/2013 | Dannoux et al. |
| 8,833,106 B2 | 9/2014 | Dannoux et al. |
| 8,912,447 B2 | 12/2014 | Leong et al. |
| 9,061,934 B2 | 6/2015 | Bisson et al. |
| 9,383,768 B1 | 7/2016 | Menon |
| 9,593,042 B2 | 3/2017 | Hu et al. |
| 9,802,485 B2 | 10/2017 | Masuda et al. |
| 9,895,975 B2 | 2/2018 | Lee et al. |
| 9,902,640 B2 | 2/2018 | Dannoux et al. |
| 9,931,817 B2 | 4/2018 | Rickerl |
| 10,131,118 B2 | 11/2018 | Kang et al. |
| 2007/0221313 A1 | 9/2007 | Franck et al. |
| 2007/0223121 A1 | 9/2007 | Franck et al. |
| 2008/0303976 A1* | 12/2008 | Nishizawa ......... G02F 1/133305 349/64 |
| 2009/0179840 A1 | 7/2009 | Tanaka et al. |
| 2009/0185127 A1 | 7/2009 | Tanaka et al. |
| 2010/0031590 A1 | 2/2010 | Buchwald et al. |
| 2012/0202030 A1 | 8/2012 | Kondo et al. |
| 2013/0088441 A1 | 4/2013 | Chung et al. |
| 2014/0036428 A1 | 2/2014 | Seng et al. |
| 2014/0295150 A1* | 10/2014 | Bower .................... B32B 25/20 428/411.1 |
| 2015/0246507 A1 | 9/2015 | Brown et al. |
| 2016/0297176 A1 | 10/2016 | Rickerl |
| 2016/0306451 A1 | 10/2016 | Isoda et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0327402 A1 | 11/2017 | Fujii et al. |
| 2017/0349473 A1 | 12/2017 | Moriya et al. |
| 2018/0050948 A1 | 2/2018 | Faik et al. |
| 2018/0111569 A1* | 4/2018 | Faik ...................... B60K 35/00 |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0188869 A1 | 7/2018 | Boggs et al. |
| 2018/0210118 A1 | 7/2018 | Gollier et al. |
| 2018/0215125 A1 | 8/2018 | Gahagan |
| 2019/0039935 A1 | 2/2019 | Couillard et al. |
| 2019/0315648 A1 | 10/2019 | Kumar et al. |
| 2020/0062632 A1 | 2/2020 | Brennan et al. |
| 2020/0171952 A1 | 6/2020 | Couillard et al. |
| 2021/0008846 A1 | 1/2021 | Kumar et al. |

FOREIGN PATENT DOCUMENTS

| | | | |
|---|---|---|---|
| CN | 104679341 A | 6/2015 | |
| CN | 204463066 U | 7/2015 | |
| CN | 104843976 A | 8/2015 | |
| CN | 105511127 A | 4/2016 | |
| DE | 4415878 A1 | 11/1995 | |
| DE | 102004022008 A1 | 12/2004 | |
| DE | 102013214108 A1 | 2/2015 | |
| FR | 2918411 A1 | 1/2009 | |
| GB | 2011316 A | 7/1979 | |
| JP | 3059337 U | 6/1991 | |
| JP | 11-060293 A | 3/1999 | |
| JP | 2003-500260 A | 1/2003 | |
| JP | 2013-084269 A | 5/2013 | |
| JP | 2013-188993 A | 9/2013 | |
| JP | 2015-092422 A | 5/2015 | |
| JP | 5748082 B2 | 7/2015 | |
| JP | 2016-031696 A | 3/2016 | |
| JP | 5976561 B2 | 8/2016 | |
| JP | 2016-173794 A | 9/2016 | |
| JP | 2016-203609 A | 12/2016 | |
| JP | 2016-207200 A | 12/2016 | |
| KR | 10-2016-0144008 A | 12/2016 | |
| WO | 98/01649 A1 | 1/1998 | |
| WO | 2000/073062 A1 | 12/2000 | |
| WO | 2007/108861 A1 | 9/2007 | |
| WO | 2011/029852 A1 | 3/2011 | |
| WO | 2012/058084 A2 | 5/2012 | |
| WO | 2013/072611 A1 | 5/2013 | |
| WO | 2014/175371 A1 | 10/2014 | |
| WO | 2015/031594 A2 | 3/2015 | |
| WO | 2016/044360 A1 | 3/2016 | |
| WO | 2016/125713 A1 | 8/2016 | |
| WO | 2016/136758 A1 | 9/2016 | |
| WO | 2016/196531 A1 | 12/2016 | |
| WO | 2016/196546 A1 | 12/2016 | |
| WO | 2017/155932 A1 | 9/2017 | |
| WO | WO-2017155932 A1 * | 9/2017 | ............... B60J 1/00 |
| WO | 2018/005646 A1 | 1/2018 | |
| WO | 2018/009504 A1 | 1/2018 | |
| WO | 2018/075853 A1 | 4/2018 | |
| WO | 2018/081068 A1 | 5/2018 | |
| WO | 2018/125683 A1 | 7/2018 | |

OTHER PUBLICATIONS

ASTM standard C770-98 (2013), entitled "Standard Test Method for Measurement of Glass Stress-Optical Coefficient,".
International Search Report and Written Opinion of the International Searching Authority; PCT/US2018/012215 dated Aug. 1, 18; 21 Pgs; European Patent Office.
International Search Report and Written Opinion of the International Searching Authority; PCT/US2018/041062 dated Nov. 13, 18; 15 Pgs; European Patent Office.
Invitation to Pay Additional Fees of the International Searching Authority; PCT/US2018/012215; dated May 11, 2018; 13 Pages; European Patent Office.

* cited by examiner

FIGURE 6
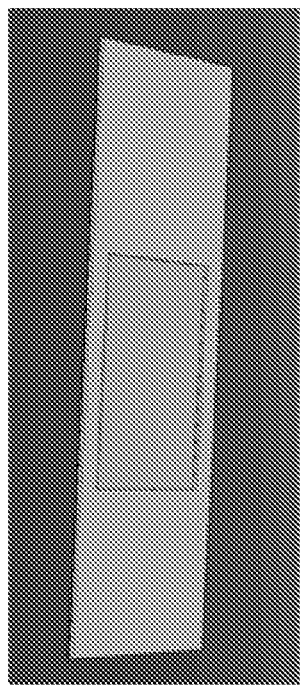
Simulation method: laminate glass to frame by adhesive, change temperature from 100C to 20C, the plan see table in below;
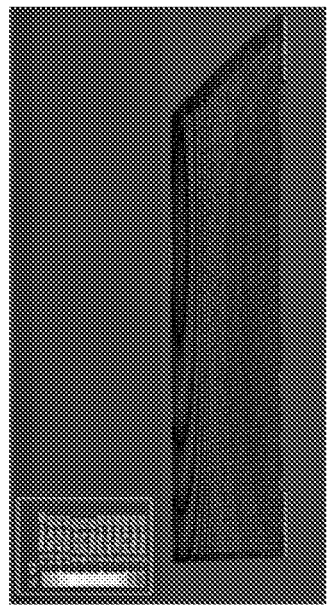
Get depth of buckling by plot deflection on glass surface, result show in table;
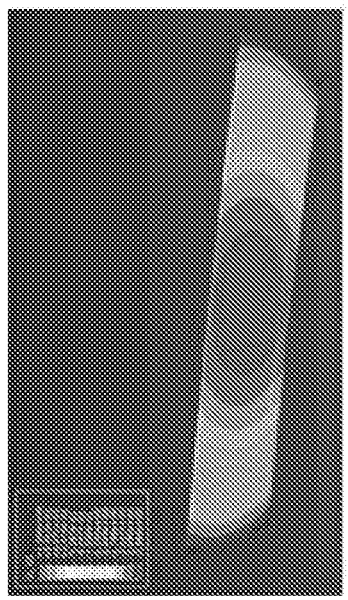

COLD-FORMED GLASS ARTICLE WITH THERMALLY MATCHED SYSTEM AND PROCESS FOR FORMING THE SAME

CROSS-REFERENCE TO RELATED APPLICATIONS

This application is a national stage application under 35 U. S. C. § 371 of International Application No. PCT/US2019/062141 filed on Nov. 19, 2019, which claims the benefit of priority under 35 U.S.C. § 119 of U.S. Provisional Application Ser. No. 62/773,505 filed on Nov. 30, 2018 and U.S. Provisional Application Ser. No. 62/773,497 filed on Nov. 30, 2018, the content of which are relied upon and incorporated herein by reference in their entirety.

BACKGROUND

The disclosure relates to vehicle interior systems including glass and methods for forming the same, and more particularly to vehicle interior systems including a curved glass article with a cold-formed or cold-bent cover glass and methods for forming the same.

Vehicle interiors include curved surfaces and can incorporate displays in such curved surfaces. The materials used to form such curved surfaces are typically limited to polymers, which do not exhibit the durability and optical performance as glass. As such, curved glass substrates are desirable, especially when used as covers for displays. Existing methods of forming such curved glass substrates, such as thermal forming, have drawbacks including high cost, optical distortion, and surface marking.

In addition, curved surface are typically bonded to a frame or underlying surface using an adhesive material. However, deformation of the curved surface is possible from a combination of properties of the curved surface, the adhesive, and the frame. Such deformation may occur during the manufacturing process or during use of the vehicle interior system.

Accordingly, Applicant has identified a need for vehicle interior systems that can incorporate a curved glass substrate in a cost-effective manner, with high reliability and reduced unwanted deformation, and without problems typically associated with glass thermal forming processes.

SUMMARY

According to an aspect, embodiments of the disclosure relate to a curved glass article. In one or more embodiments, a cover glass sheet includes a first major surface and a second major surface, with the second major surface having a first region with a first curve of a first radius of curvature, and a second region that is different than the first region. A frame of the glass article has a support surface including a third region of a first frame material and a fourth region of a second frame material that is different than the first frame material. The second major surface of the cover glass sheet faces the support surface of the frame, and the third region includes a second curve that complements the first curve while the fourth region complements the second region. A first adhesive is disposed between the third region of the support surface of the frame and the first region of the second major surface of the cover glass sheet. A second adhesive is disposed between the fourth region of the support surface of the frame and the second region of the second major surface of the cover glass sheet. The first adhesive has a first Young's modulus, and the second adhesive comprising a second Young's modulus that is different than the first Young's modulus.

In another embodiment, a glass article is providing having a cover glass sheet with a first major surface and a second major surface. The second major surface includes a first region having a first curve with a first radius of curvature, and a second region that is different than the first region. A frame includes a first support surface and a second support surface, where the first support surface includes a first frame material and conforms with the first region of the second major surface. The second support surface includes a second frame material and conforms with the second region of the second major surface. A first adhesive is disposed between the first support surface and the first region of the second major surface. A second adhesive is disposed between the second support surface and the second region of the second major surface, where the first frame material is different than the second frame material, and the first region comprises a higher curvature than the second region.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6 is the finite element results of modeling data of embodiments discussed herein.

DETAILED DESCRIPTION

Figure 1:
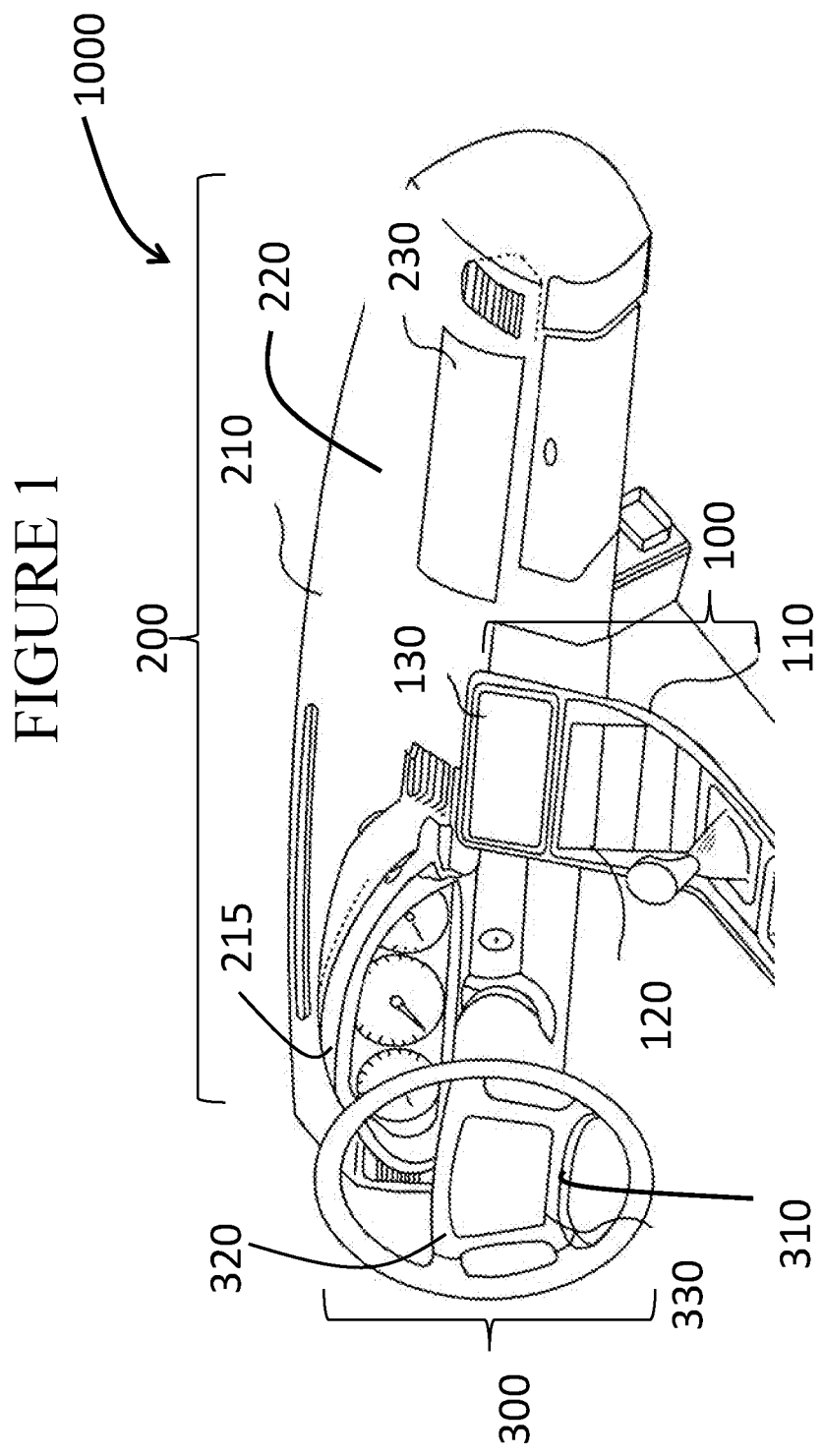
FIG. 1 is a perspective view of a vehicle interior with vehicle interior systems, according to one or more embodiments.

Reference will now be made in detail to various embodiments, examples of which are illustrated in the accompanying drawings. In general, a vehicle interior system may include a variety of different curved surfaces that are designed to be transparent, such as curved display surfaces and curved non-display glass covers, and the present disclosure provides articles and methods for forming these curved surfaces from a glass material. Forming curved vehicle surfaces from a glass material provides a number of advantages compared to the typical curved plastic panels that are conventionally found in vehicle interiors. For example, glass is typically considered to provide enhanced functionality and user experience in many curved cover material applications, such as display applications and touch screen applications, compared to plastic cover materials.

Accordingly, as will be discussed in more detail below, Applicant has developed a glass article and related manufacturing processes that provide an efficient and cost-effective way to form an article, such as a display for a vehicle interior system, utilizing a cold-bent piece of glass substrate.

The automotive industry has witnessed a growing need, driven by consumer demand, for technological innovation in vehicle interiors. Accordingly, vehicle manufactures are creating interiors are more connected and more interactive, while providing a safe vehicle environment for drivers and passengers. For example, large-format displays are becoming more prevalent, a trend which is expected to continue as the industry moves towards autonomous driving. There is also demand for these larger displays to include touch functionality similar to the touchscreen phone, tablet, and computer interfaces to which consumers have become accustomed. Most of the displays for vehicle interiors consist of two-dimensional plastic cover lenses, but there is interest in having three-dimensional surfaces for design flexibility.

While plastic materials can be easier to mold into three-dimensional shapes than glass, plastics exhibit many inferior properties compared to glass. In particular, plastics materials are prone to permanent damage during blunt impact, general wear, and ultra-violet (UV) exposure. The use of hard coatings on plastics alleviates the issues to some extent, but plastics (with or without hard coatings) have many shortcomings compared to glass.

Glass is an appealing alternative to plastic cover lenses due to the superior functionality and user experience that glass provides. Yet, the cover glass lenses have mostly been limited to two-dimensional surfaces. The conventional method of forming three-dimensional glass surfaces is to use a hot-bending or hot-forming process. The process is energy intensive due to the high temperatures involved and adds significant cost to the product. Thus, there is a need to develop a low-cost technology to make three-dimensional glass surfaces.

Thus, in one or more embodiments described herein, a glass article is formed by cold-bending a glass sheet onto a frame to which the glass sheet is adhered using an adhesive between the glass sheet and frame. As used herein, the terms "cold-bent," "cold bending," "cold-formed" or "cold forming" refers to curving the glass substrate at a cold-form temperature which is less than the glass transition temperature of the glass material of glass substrate. One of the perceived challenges with cold-bent glass is the limit to which it can be safely bent and installed in a vehicle. With the interior designers requiring very sharp curvatures or complex shapes having multiple curves, there is a need to develop a solution to safely implement glass in automotive interiors. In particular, the cold-bending process imparts bending stress and changes the central tension in the glass. This in turns affects the glass frangibility and risk of retention during a catastrophic failure such as local sharp impact. In addition, Applicant has discovered that unwanted deformation of the glass article can occur during manufacturing and processing of the glass article. For example, deformation may occur during curing of the adhesive at high temperature and/or subsequent cooling of the glass article, or deformation may occur during thermal cycling of the glass article. Accordingly, embodiments herein provide glass articles with significantly lower or no distortion from these processes. Addressing these deformation issues also allows for greater design flexibility of the glass article while also having higher reliability.

In one or more embodiments disclosed herein, improved glass articles and methods of forming them are achieved by focusing on the interaction of the glass, adhesive, and frame. In an aspect of some embodiments, combination of structural adhesive and frame material is chosen to minimize the product deformation due to different thermal expansion mismatch and at the same time provide a three-dimensional (3D) cold-form glass article. In addition to the coefficients of thermal expansion, the elongation of adhesives is also described and considered in designed improved glass articles. While high modulus structural adhesives are capable of holding the cold-bent glass to its shape, the relatively lower values of their elongation, along with different coefficient of thermal expansion of the cover glass and frame materials can lead to product deformation during curing (both heating and subsequent cooling cycling) and thermal cycling events.

The advantages of embodiments herein are achieved by designing glass articles with specific combinations of structural features and materials. Materials include the materials of the frame, glass, and adhesive, while structural features include, for example, the size of the glass article, glass sheet thickness, and geometry of the finished glass article, including radii of curvature, for example. For small radii (such as 250 mm), toughened epoxy having a lower elongation (less than about 10% elongation, for example) are preferred due to their higher strength. Due to lower elongation characteristics of toughened epoxies, the frame materials used may have similar CTE to that of the glass sheet (e.g., Corning Gorilla® glass), such as SS410. On the other hand, with gentle radius (such as about 600 mm or higher), a wider variety of adhesive materials may be used including toughened epoxies, urethanes and silicones (with a modulus of about 10 MPa). Silicone structural adhesives have a high elongation (~200%) and can be used in combination with frame and glass materials that have a larger CTE mismatch. For example, silicone structural adhesive could be used to bond Gorilla® glass with polycarbonate acrylonitrile butadiene styrene (PC/ABS) or Magnesium (Mg) AZ91D alloy. If using toughened epoxies for gentle radius, frame materials of similar CTE to that of cover glass may be used.

In addition, as an aspect of embodiments disclosed herein, multiple adhesive materials may be used in a single glass article, especially in glass article of large size and/or complex shape. Large parts are more prone to deformation due to CTE mismatch. For example, in one or more embodiments, a high modulus toughened epoxy (with lower elongation) is used in curved areas of a product design, and low modulus adhesive materials (with higher elongation)—such as silicones adhesives, for example—is used in a flat area or area of lower curvature. The reference product design may be, for example, an S-shape or a shape having a combination of a curved part with an additional part that is flat or curved. The use of multiple adhesives can also enable simplifications in forming processes, such as alignment in the cold-form process. For example, VHB materials (pressure sensitive adhesive) could be used in the display area of reference product design, while also being used for alignment of cover glass to the frame. Note, the curved areas of reference product design can, in some preferred embodiments, use high modulus toughened epoxy materials (such as 3M™ Scotch-Weld™ DP460).

In a further aspect of one or more embodiments, a large format parts may use a hybrid approach for the frame materials. In particular, the frame can be made of different materials having different CTEs, where the selected frame materials are chosen at least in part based on the location or geometry of that part of the within the product design and the CTE of the frame material. For example, the curved areas of an S-shaped part could be fabricated out of SS410 (which has similar CTE to that of Gorilla® glass) while flat display area could be fabricated out of materials such as PC/ABS, Al 5052 H32 alloy, or Mg AZ91D alloy, as longer elongation silicone adhesives can tolerate large CTE mismatch materials.

A method of forming curved glass articles is provided. In one or more embodiments, a structural adhesive is applied to a 3D frame in a first step of the method. Structural adhesives include materials from epoxy (toughened, flexible), acrylics, urethanes, silicones or other similar categories. These adhesives could be thermally cured, or cured at room temperature. The dispensing process applies structural adhesives uniformly over the entire surface of the 3D frame. Standard dispensing process such as bead dispenser, roll coating, screen printing, slot-die coating, ink-jet coating, spray coating, or other similar processes could be utilized for this step. After the dispensing process, the frame is transferred over to the vacuum table. A base plate may be utilized to support the frame (including alignment). The cover glass is then transferred to the vacuum table and placed on top of the 3D frame with structural adhesive. The cover glass is aligned to 3D frame, using alignment pins/rails features, for example. The lid of vacuum table is closed and vacuum pressure is applied to cold form the glass to the shape of the 3D frame. The base of the vacuum table is heated to ensure curing of the structural adhesives. Additionally, heat is also applied from the top of vacuum table. After certain degree of adhesive curing, the part achieves the green strength and is removed from the vacuum table. Remaining curing of the adhesive happens at room temperature for extended period of time (1-2 days).

FIG. 1 shows an example of a vehicle interior 1000 that includes three different embodiments of a vehicle interior system 100, 200, 300. Vehicle interior system 100 includes a frame, shown as center console base 110, with a curved surface 120 including a curved display 130. Vehicle interior system 200 includes a frame, shown as dashboard base 210, with a curved surface 220 including a curved display 230. The dashboard base 210 typically includes an instrument panel 215 which may also include a curved display. Vehicle interior system 300 includes a frame, shown as steering wheel base 310, with a curved surface 320 and a curved display 330. In one or more embodiments, the vehicle interior system includes a frame that is an arm rest, a pillar, a seat back, a floor board, a headrest, a door panel, or any portion of the interior of a vehicle that includes a curved surface. In other embodiments, the frame is a portion of a housing for a free-standing display (i.e., a display that is not permanently connected to a portion of the vehicle).

The embodiments of the curved glass article described herein can be used in each of vehicle interior systems 100, 200 and 300. Further, the curved glass articles discussed herein may be used as curved cover glasses for any of the curved display embodiments discussed herein, including for use in vehicle interior systems 100, 200 and/or 300. Further, in various embodiments, various non-display components of vehicle interior systems 100, 200 and 300 may be formed from the glass articles discussed herein. In some such embodiments, the glass articles discussed herein may be used as the non-display cover surface for the dashboard, center console, door panel, etc. In such embodiments, glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront functionality.

Figure 2:
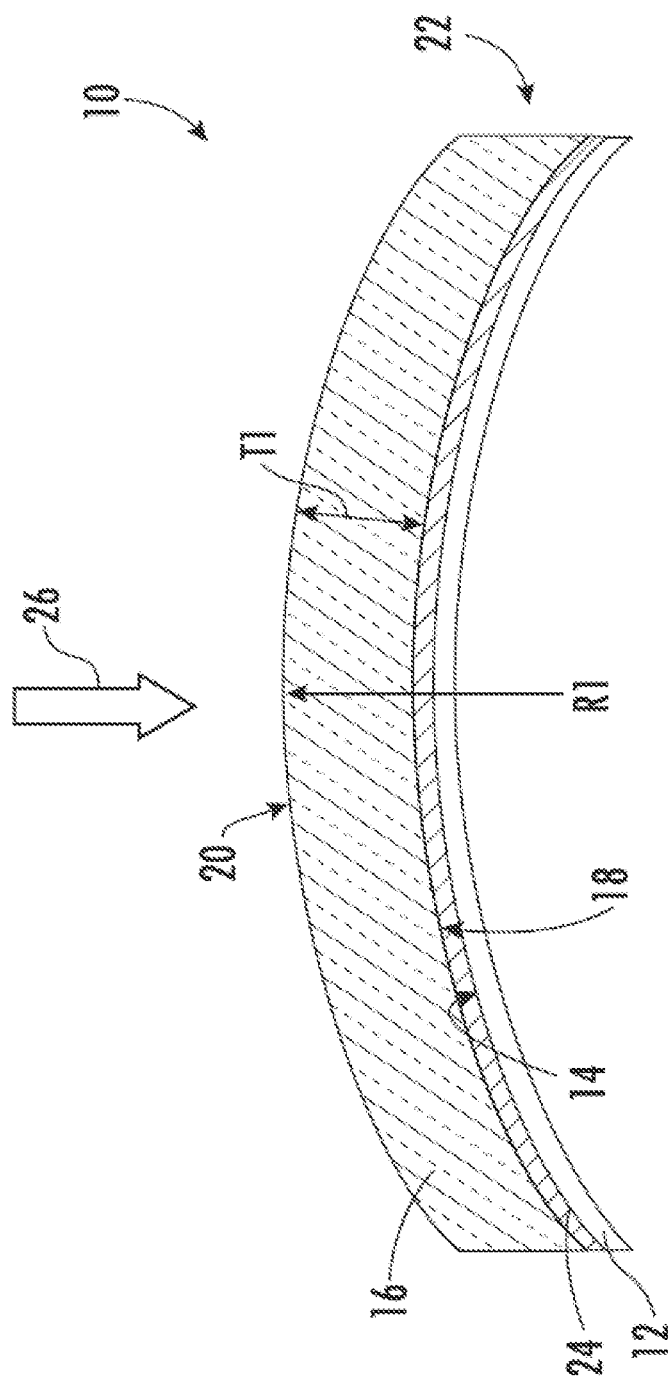
FIG. 2 is a cross-sectional view of a glass substrate following cold bending and attachment to a curved frame, according to one or more embodiments.

FIG. 2 depicts a curved glass article 10, such as the cover glass for curved display 130, according to one or more embodiments. It should be understood that while FIG. 2 is described in terms of forming curved display 130, the curved glass article 10 of FIG. 2 may be used in any suitable curved glass application, including any curved glass component of any of the vehicle interior systems of FIG. 1. Such curved glass components could be display or non-display regions, e.g., a flat display area and a curved non-display area, curved displays, and curved display and curved non-display areas.

In FIG. 2, a frame 12 includes a curved surface, shown as curved surface 14. Curved glass article 10 includes a glass substrate 16. Glass substrate 16 includes a first major surface 18 and a second major surface 20 opposite first major surface 18. A minor surface 22 connects the first major surface 18 and the second major surface 20, and in specific embodiments, minor surface 22 defines the outer perimeter of glass substrate 16. The glass substrate 16 is attached to the frame 12 via an adhesive layer 24. In embodiments, the adhesive layer 24 comprises at least two adhesives.

In general, glass substrate 16 is cold formed or cold bent to the desired curved shape via application of a bending force 26. As shown in FIG. 2, following cold bending, the glass substrate 16 has a curved shape such that first major surface 18 and second major surface 20 each include at least one curved section having a radius of curvature. In the specific embodiments shown, curved surface 14 of frame 12 is a convex curved surface. In such embodiments, the glass substrate 16 is bent such that first major surface 18 defines a concave shape that generally conforms to the convex curved shape of curved surface 14, and second major surface 20 defines a convex shape that generally matches or mirrors the convex curved shape of curved surface 14. In such embodiments, surfaces 18, 20 both define a first radius of curvature R1 that generally matches the radius of curvature of curved surface 14 of frame 12.

In embodiments, R1 is between 30 mm and 5 m. Further, in embodiments, the glass substrate 16 has a thickness T1 (e.g., an average thickness measured between surfaces 18, 20) shown in FIG. 2 that is in a range from 0.05 mm to 2 mm. In specific embodiments, T1 is less than or equal to 1.5 mm and in more specific embodiments, T1 is 0.4 mm to 1.3 mm. Applicant has found that such thin glass substrates can be cold formed to a variety of curved shapes (including the relatively high curvature radii of curvature discussed herein) utilizing cold forming without breakage while at the same time providing for a high-quality cover layer for a variety of vehicle interior applications. In addition, such thin glass substrates 16 may deform more readily, which could potentially compensate for shape mismatches and gaps that may exist relative to curved surface 14 and/or frame 12.

In various embodiments, first major surface 18 and/or the second major surface 20 of glass substrate 16 includes one or more surface treatments or layers. The surface treatment may cover at least a portion of the first major surface 18 and/or second major surface 20. Exemplary surface treatments include anti-glare surfaces/coatings, anti-reflective surfaces/coatings, and an easy-to-clean surface coating/ treatment. In one or more embodiments, at least a portion of the first major surface 18 and/or the second major surface 20 may include any one, any two or all three of an anti-glare surface, an anti-reflective surface, and easy-to-clean coating/ treatment. For example, first major surface 18 may include an anti-glare surface and second major surface 20 may include an anti-reflective surface. In another example, first major surface 18 includes an anti-reflective surface and second major surface 20 includes an anti-glare surface. In yet another example, the first major surface 18 comprises either one of or both the anti-glare surface and the anti-reflective surface, and the second major surface 20 includes the easy-to-clean coating.

In embodiments, the glass substrate 16 may also include a pigment design on the first major surface 18 and/or second major surface 20. The pigment design may include any aesthetic design formed from a pigment (e.g., ink, paint and the like) and can include a wood-grain design, a brushed metal design, a graphic design, a portrait, or a logo. The pigment design may be printed onto the glass substrate. In one or more embodiments, the anti-glare surface includes an etched surface. In one or more embodiments, the anti-reflective surface includes a multi-layer coating.

In an aspect of one or more embodiments described herein, the glass article can include one or more adhesives, which can include pressure sensitive adhesives (PSA), UV curable acrylic adhesives, polyurethane (PUR) hotmelts, silicone hotmelts, etc. For example, adhesives can include one or more PSA, such as 3M™ VHB™ (available from 3M, St. Paul, MN) and tesa® (available from tesa SE, Norderstedt, Germany), or UV curable adhesives, such as DELO DUALBOND® MF4992 (available from DELO Industrial Adhesives, Windach, Germany). Some adhesives contemplated can be cured using, e.g., one or more of pressure, heat, or ultraviolet radiation. Additional example adhesives include toughened epoxy, flexible epoxy, acrylics, silicones, urethanes, polyurethanes, and silane modified polymers. One or more tough epoxies can include, for example, EP21TDCHT-LO (available from Masterbond®, Hackensack, NJ), 3M™ Scotch-Weld™ Epoxy DP460 Off-White (available from 3M, St. Paul, MN). One or more flexible expoxies can include, for example, Masterbond EP21TDC-2LO (available from Masterbond®, Hackensack, NJ), 3M™ Scotch-Weld™ Epoxy 2216 B/A Gray (available from 3M, St. Paul, MN), and 3M™ Scotch-Weld™ Epoxy DP125. Adhesives can include one or more acrylics, such as LORD® Adhesive 410/Accelerator 19 w/LORD® AP 134 primer, LORD® Adhesive 852/LORD® Accelerator 25 GB (both being available from LORD Corporation, Cary, NC), DELO PUR SJ9356 (available from DELO Industrial Adhesives, Windach, Germany), Loctite® AA4800, Loctite® HF8000. TEROSON® MS 9399, and TEROSON® MS 647-2C (these latter four being available from Henkel AG & Co. KGaA, Dusseldorf, Germany), among others. Adhesives can also include urethanes, such as 3M™ Scotch-Weld™ Urethane DP640 Brown and 3M™ Scotch-Weld™ Urethane DP604, or one or more silicones, such as Dow Corning® 995 (available from Dow Corning Corporation, Midland, MI).

In embodiments, a primer can be applied to prepare the surfaces of the glass substrate 16 and frame 12 for better adhesion to the first adhesive 28 and/or the second adhesive 30, especially for frames 12 made of metal or including metal surfaces and for the glass surface of the glass substrate 16. Further, in embodiments, an ink primer may be used in addition to or instead of the primer for metal and glass surfaces. The ink primer helps provide better adhesion between the first adhesive 28 and/or second adhesive 30 to ink covered surfaces (e.g., the pigment design mentioned above for deadfronting applications). An example of a primer is 3M™ Scotch-Weld™ Metal Primer 3901 (available from 3M, St. Paul, MN); other commercially available primers are also suitable for use in the present disclosure and can be selected based on surfaces involved in the bonding and on the adhesive used to create the bond.

In various embodiments, glass substrate 16 is formed from a strengthened glass sheet (e.g., a thermally strengthened glass material, a chemically strengthened glass sheet, etc.) In such embodiments, when glass substrate 16 is formed from a strengthened glass material, first major surface 18 and second major surface 20 are under compressive stress, and thus second major surface 20 can experience greater tensile stress during bending to the convex shape without risking fracture. This allows for strengthened glass substrate 16 to conform to more tightly curved surfaces.

A feature of a cold-formed glass substrate is an asymmetric surface compressive between the first major surface 18 and the second major surface 20 once the glass substrate has been bent to the curved shape. In such embodiments, prior to the cold-forming process or being cold-formed, the respective compressive stresses in the first major surface 18 and the second major surface 20 of glass substrate 16 are substantially equal. After cold-forming, the compressive stress on concave first major surface 18 increases such that the compressive stress on the first major surface 18 is greater after cold-forming than before cold-forming. In contrast, convex second major surface 20 experiences tensile stresses during bending causing a net decrease in surface compressive stress on the second major surface 20, such that the compressive stress in the second major surface 20 following bending is less than the compressive stress in the second major surface 20 when the glass sheet is flat.

As noted above, in addition to providing processing advantages such as eliminating expensive and/or slow heating steps, the cold-forming processes discussed herein are believed to generate curved glass articles with a variety of properties that are superior to hot-formed glass articles, particularly for vehicle interior or display cover glass applications. For example, Applicant believes that, for at least some glass materials, heating during hot-forming processes decreases optical properties of curved glass sheets, and thus, the curved glass substrates formed utilizing the cold-bending processes/systems discussed herein provide for both curved glass shapes along with improved optical qualities not believed achievable with hot-bending processes.

Further, many glass surface treatments (e.g., anti-glare coatings, anti-reflective coatings, easy-to-clean coating, etc.) are applied via deposition processes, such as sputtering processes that are typically ill-suited for coating curved glass articles. In addition, many surface treatments (e.g., anti-glare coatings, anti-reflective coatings, easy-to-clean coating, etc.) also are not able to survive the high temperatures associated with hot-bending processes. Thus, in particular embodiments discussed herein, one or more surface treatments are applied to the first major surface 18 and/or to the second major surface 20 of glass substrate 16 prior to cold-bending, and the glass substrate 16 including the surface treatment is bent to a curved shape as discussed herein. Thus, Applicant believes that the processes and systems discussed herein allow for bending of glass after one or more coating materials have been applied to the glass, in contrast to typical hot-forming processes.

Figure 3:
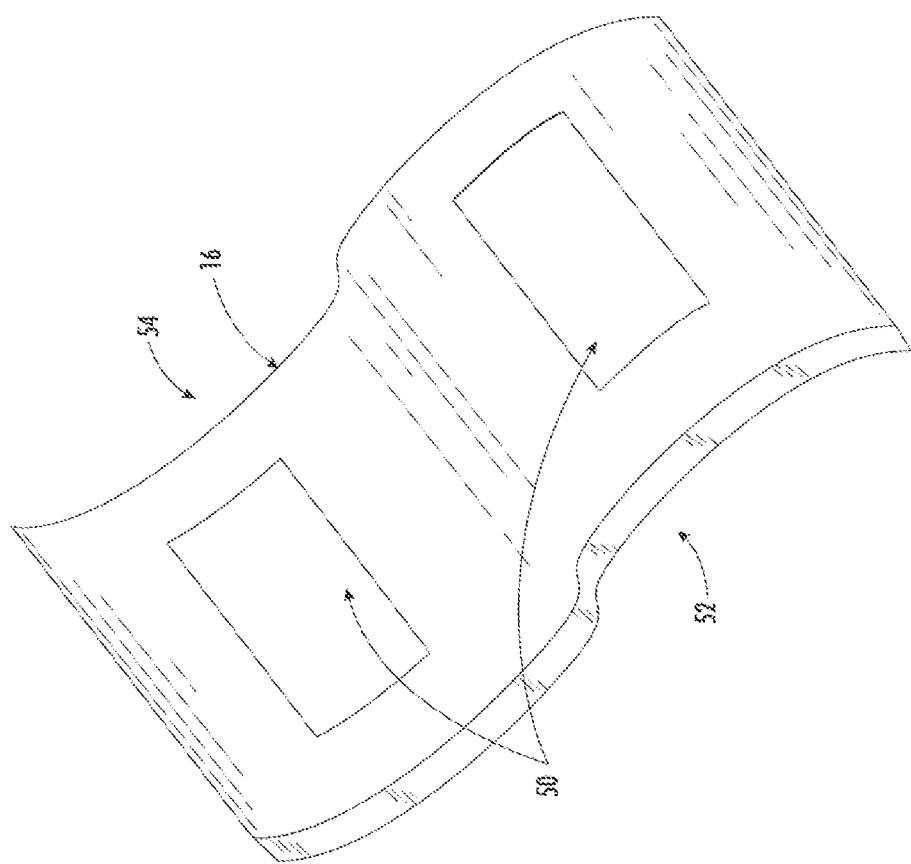
FIG. 3 is a perspective view of a curved glass substrate with multiple convex and concave curved surfaces, according to an exemplary embodiment.
Figure 4:
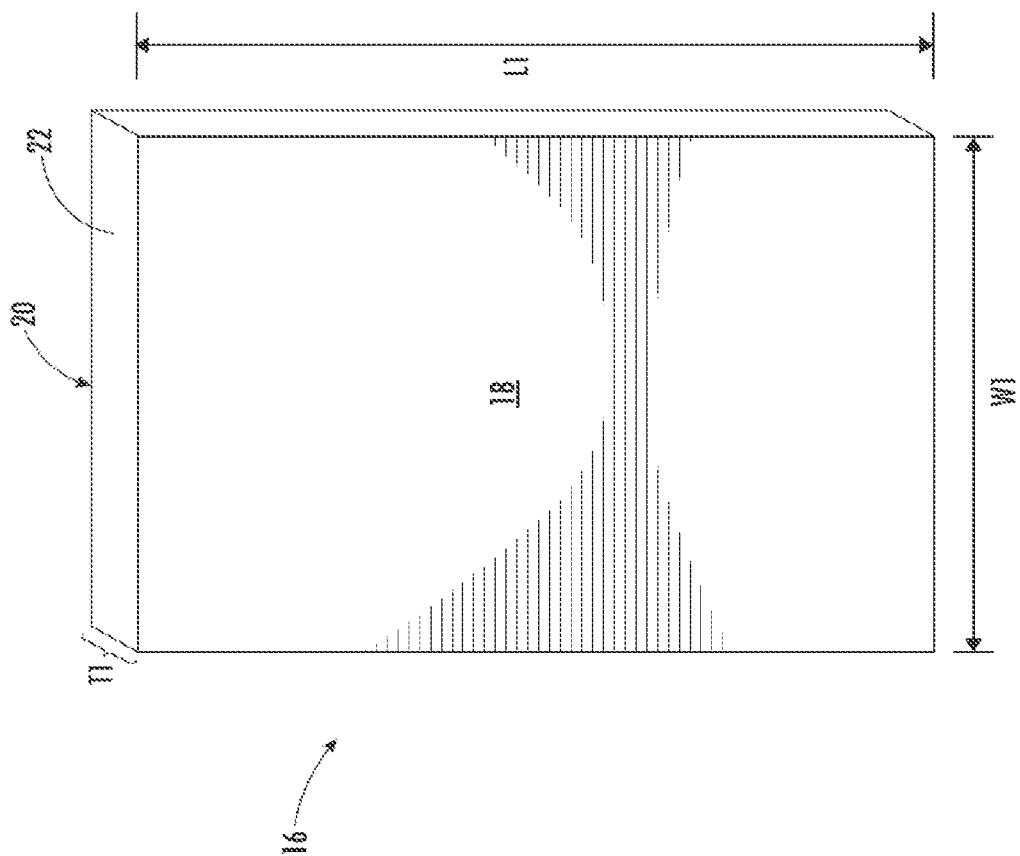
FIG. 4 is a front perspective view of a glass substrate, according to an exemplary embodiment.

It should be noted that, in FIG. 2, the glass substrate 16 is shown having a single curvature such that second major surface 20 has a single convex radius of curvature and the first major surface 18 has a single concave radius of curvature. However, the method discussed herein allows for the glass substrate 16 to be bent to more complex shapes. For example, as shown in FIG. 3, the glass substrate 16 is bent to a shape such that the first major surface 18 has both convex and concave curved sections, and the second major surface 20 has both convex and concaved curved sections, forming an S-shaped glass substrate when viewed in cross-section. Additionally, the glass substrate 16 may include flat regions (not shown) between curved sections.

In various embodiments, a cold-formed glass substrate 16 may have a compound curve including a major radius and a cross curvature. A complexly curved cold-formed glass substrate 16 may have a distinct radius of curvature in two independent directions. According to one or more embodiments, a complexly curved cold-formed glass substrate 16 may thus be characterized as having "cross curvature," where the cold-formed glass substrate 16 is curved along an axis (i.e., a first axis) that is parallel to a given dimension and also curved along an axis (i.e., a second axis) that is perpendicular to the same dimension. The curvature of the cold-formed glass substrate and the curved display can be even more complex when a significant minimum radius is combined with a significant cross curvature, and/or depth of bend. In various embodiments, glass substrate 16 can have more than two curved regions with the same or differing curved shapes. In some embodiments, glass substrate 16 can have one or more region having a curved shape with a variable radius of curvature.

Figure 5:
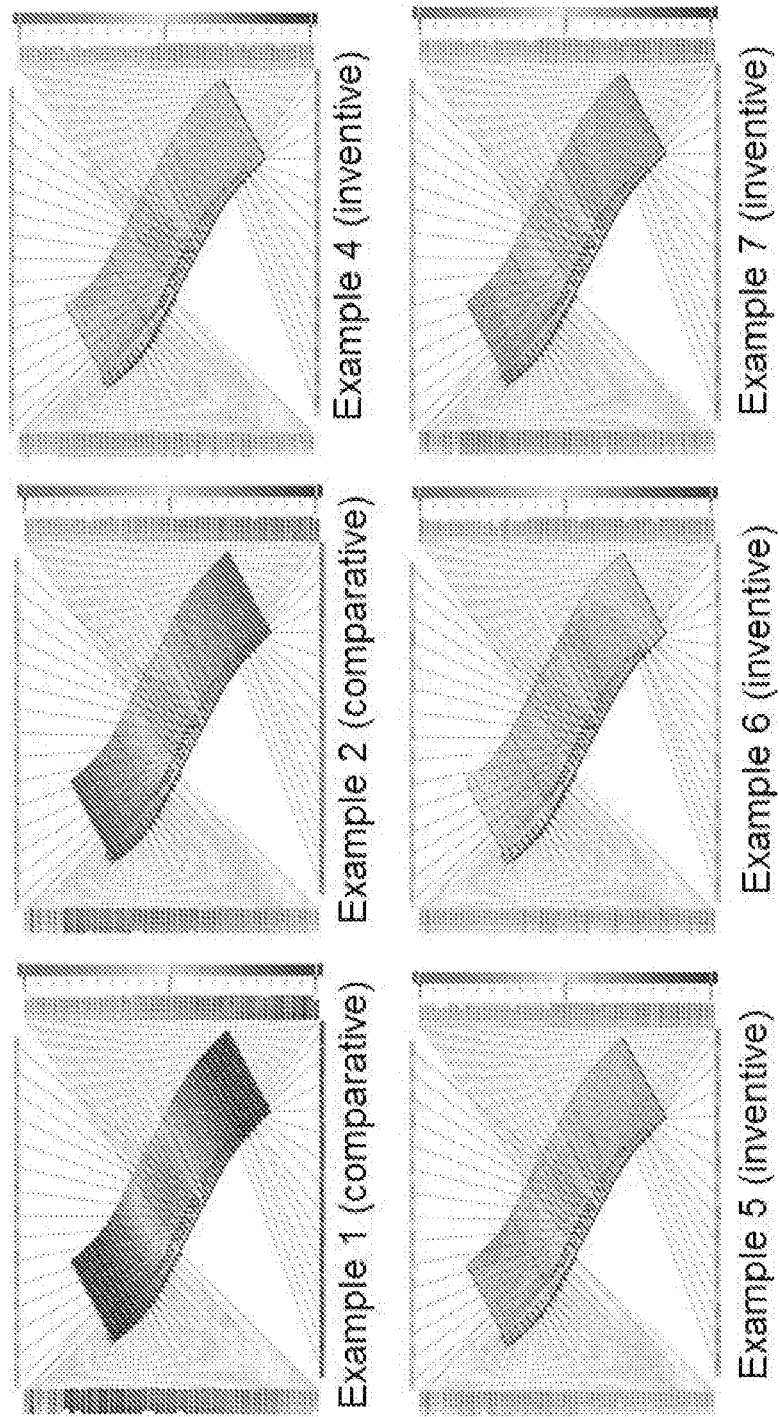
FIG. 5 is a series of computational results of ATOS data for glass articles according to Comparative Examples and Examples discussed herein.

Referring to FIG. 5, additional structural details of glass substrate 16 are shown and described. As noted above, glass substrate 16 has a thickness T1 that is substantially constant and is defined as a distance between the first major surface 18 and the second major surface 20. In various embodiments, T1 may refer to an average thickness or a maximum thickness of the glass substrate. In addition, glass substrate 16 includes a width W1 defined as a first maximum dimension of one of the first or second major surfaces 18, 20 orthogonal to the thickness T1, and a length L1 defined as a second maximum dimension of one of the first or second major surfaces 18, 20 orthogonal to both the thickness and the width. In other embodiments, W1 and L1 may be the average width and the average length of glass substrate 16, respectively.

In various embodiments, thickness T1 is 2 mm or less and specifically is 0.3 mm to 1.1 mm. For example, thickness T1 may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the T1 falls within any one of the exact numerical ranges set forth in this paragraph.

In various embodiments, width W1 is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W1 falls within any one of the exact numerical ranges set forth in this paragraph.

In various embodiments, length L1 is in a range from about 5 cm to about 1500 cm, from about 50 cm to about 1500 cm, from about 100 cm to about 1500 cm, from about 150 cm to about 1500 cm, from about 200 cm to about 1500 cm, from about 250 cm to about 1500 cm, from about 300 cm to about 1500 cm, from about 350 cm to about 1500 cm, from about 400 cm to about 1500 cm, from about 450 cm to about 1500 cm, from about 500 cm to about 1500 cm, from about 550 cm to about 1500 cm, from about 600 cm to about 1500 cm, from about 650 cm to about 1500 cm, from about 650 cm to about 1500 cm, from about 700 cm to about 1500 cm, from about 750 cm to about 1500 cm, from about 800 cm to about 1500 cm, from about 850 cm to about 1500 cm, from about 900 cm to about 1500 cm, from about 950 cm to about 1500 cm, from about 1000 cm to about 1500 cm, from about 1050 cm to about 1500 cm, from about 1100 cm to about 1500 cm, from about 1150 cm to about 1500 cm, from about 1200 cm to about 1500 cm, from about 1250 cm to about 1500 cm, from about 1300 cm to about 1500 cm, from about 1350 cm to about 1500 cm, from about 1400 cm to about 1500 cm, or from about 1450 cm to about 1500 cm. In other embodiments, L1 falls within any one of the exact numerical ranges set forth in this paragraph.

In various embodiments, one or more radius of curvature (e.g., R1 shown in FIG. 2) of glass substrate 134 is about 60 mm or greater. For example, R1 may be in a range from about 60 mm to about 10,000 mm, from about 70 mm to about 10,000 mm, from about 80 mm to about 10,000 mm, from about 90 mm to about 10,000 mm, from about 100 mm to about 10,000 mm, from about 120 mm to about 10,000 mm, from about 140 mm to about 10,000 mm, from about 150 mm to about 10,000 mm, from about 160 mm to about 10,000 mm, from about 180 mm to about 10,000 mm, from about 200 mm to about 10,000 mm, from about 220 mm to about 10,000 mm, from about 240 mm to about 10,000 mm, from about 250 mm to about 10,000 mm, from about 260 mm to about 10,000 mm, from about 270 mm to about 10,000 mm, from about 280 mm to about 10,000 mm, from about 290 mm to about 10,000 mm, from about 300 mm to about 10,000 mm, from about 350 mm to about 10,000 mm, from about 400 mm to about 10,000 mm, from about 450 mm to about 10,000 mm, from about 500 mm to about 10,000 mm, from about 550 mm to about 10,000 mm, from about 600 mm to about 10,000 mm, from about 650 mm to about 10,000 mm, from about 700 mm to about 10,000 mm, from about 750 mm to about 10,000 mm, from about 800 mm to about 10,000 mm, from about 900 mm to about 10,000 mm, from about 950 mm to about 10,000 mm, from about 1000 mm to about 10,000 mm, from about 1250 mm to about 10,000 mm, from about 60 mm to about 9000 mm, from about 60 mm to about 8000 mm, from about 60 mm to about 7500 mm, from about 60 mm to about 7000 mm, from about 60 mm to about 6000 mm, from about 60 mm to about 5000 mm, from about 60 mm to about 4500 mm, from about 60 mm to about 4000 mm, from about 60 mm to about 3500 mm, from about 60 mm to about 3000 mm, from about 60 mm to about 2500 mm, from about 60 mm to about 2000 mm, from about 60 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, from about 60 mm to about 250 mm, or from about 500 mm to about 2500 mm. In other embodiments, R1 falls within any one of the exact numerical ranges set forth in this paragraph.

As shown in FIG. 3, glass substrate 16 can include one or more regions 50 intended to show a display (e.g., an electronic display). In addition, a glass substrate according to some embodiments can be curved in multiple regions 52 and 54 of the glass substrate and in multiple directions (i.e., the glass substrate can be curved about different axes that may or may not be parallel) as shown in FIG. 3. Accordingly, shapes and forms of the possible embodiments are not limited to the examples shown herein. Glass substrate 16 can be shaped to have a complex surface including multiple different shapes including one or more flat sections, one or more conical sections, one or more cylindrical sections, one or more spherical sections, etc.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

In one or more embodiments, a glass article is provided that includes a cover glass sheet having a first major surface and a second major surface. The second major surface includes a first curve having a first radius of curvature and a second curve having a second radius of curvature that is different than the first radius of curvature. The glass article further includes a frame having a support surface with a third curve and a fourth curve. The frame and cover glass sheet are arranged so that the second major surface of the cover glass sheet faces the support surface of the frame and the third curve complements the first curve and the fourth curve complements the second curve. A first adhesive is disposed between the third curve of the support surface of the frame and the first curve of the second major surface of the cover glass sheet. A second adhesive is disposed between the fourth curve of the support surface of the frame and the second curve of the second major surface of the cover glass sheet. The first adhesive has a first elongation, and the second adhesive comprising a second elongation that is different than the first elongation.

In an aspect of some embodiments, the first adhesive has a first Young's modulus while the second adhesive comprises a second Young's modulus that is different than the first Young's modulus. In a further aspect, the first radius of curvature is less than the second radius of curvature, and the first elongation is less than the second elongation. In addition, the first Young's modulus may be greater than the second Young's modulus.

As an aspect of some embodiments, the first elongation is about 100% or less, about 50% or less, about 40% or less, about 30% or less, about 20% or less, or about 10% or less. The second elongation is about 10% or more, about 20% or more, about 30% or more, about 40% or more, about 50% or more, about 60% or more, about 70% or more, about 80% or more, about 90% or more, about 100% or more, about 150% or more, about 200% or more, about 250% or more, or about 300% or more.

The cover glass sheet may be made of a material having a first coefficient of thermal expansion, and the frame of a material having a second coefficient of thermal expansion. As an aspect of some embodiments, a ratio of the second coefficient of thermal expansion to the first coefficient of thermal expansion is less than 2, and the first adhesive comprises an elongation of about 10% or less. In an additional aspect, the ratio of the second coefficient of thermal expansion to the first coefficient of thermal expansion is greater than or equal to 2, and the elongation of the first adhesive is greater than 10%, greater than about 50%, greater than about 100%, or greater than or equal to about 200%. The material of the frame comprises a metal, an alloy, or a polymer, including at least one of stainless steel, polycarbonate (PC), acrylnitrile-butadiene-styrene (ABS), or magnesium alloy. At least one of the first adhesive and the second adhesive may include toughened epoxy, acrylic, urethane, or silicone.

As an aspect of one or more embodiments, the first radius of curvature is about 10000 mm or less, 9000 mm or less, 8000 mm or less, 7000 mm or less, 6000 mm or less, 5000 mm or less, 4000 mm or less, 3000 mm or less, 2000 mm or less, 1000 mm or less, 750 mm or less, 600 mm or less, about 500 mm or less, about 400 mm or less, about 300 mm or less, about 250 mm or less, about 200 mm or less, or about 100 mm or less. The second radius of curvature is about 100 mm or more, about 200 mm or more, about 300 mm or more, about 400 mm or more, about 500 mm or more, about 600 mm or more, about 700 mm or more, about 800 mm or more, or about 900 mm or more. In some embodiments, the second curve has a curvature of zero or is flat.

The material of the frame and the first adhesive may satisfy one of the following conditions: (1) a ratio of the second coefficient of thermal expansion to the first coefficient of thermal expansion is less than 2, and the first adhesive comprises an elongation of about 10% or less, and (2) the ratio of the second coefficient of thermal expansion to the first coefficient of thermal expansion is greater than or equal to 2, and the elongation of the first adhesive is greater than 10%, greater than about 50%, greater than about 100%, or greater than or equal to about 200%.

The glass article may also include a display bonded to the frame or the cover glass using optically clear adhesive. A cover glass used may be a strengthened or, more specifically, a chemically strengthened aluminosilicate glass composition and have a thickness of from 0.4 mm to 2.0 mm.

According to one or more additional embodiments, a glass article includes a cover glass sheet having a first major surface and a second major surface. The second major surface has a first curve having a first radius of curvature, and the cover glass sheet includes a material having a first coefficient of thermal expansion. A frame has a support surface with a second curve, and the second major surface of the cover glass sheet faces the support surface of the frame such that the second curve complements the first curve. The frame includes a material having a second coefficient of thermal expansion, and a first adhesive is disposed between the support surface of the frame and the second major surface of the cover glass sheet. The material of the frame and the first adhesive satisfy one of the following conditions: (1) a ratio of the second coefficient of thermal expansion to the first coefficient of thermal expansion is less than 2, and the first adhesive comprises an elongation of about 10% or less, and (2) the ratio of the second coefficient of thermal expansion to the first coefficient of thermal expansion is greater than or equal to 2, and the elongation of the first adhesive is greater than 10%, greater than about 50%, greater than about 100%, or greater than or equal to about 200%.

As an aspect of some embodiments, the ratio of the second coefficient of thermal expansion to the first coefficient of thermal expansion is less than 2, and the first adhesive comprises an elongation of about 10% or less, and the first radius of curvature is about 600 mm or less, about 500 mm or less, about 400 mm or less, about 300 mm or less, about 250 mm or less, about 200 mm or less, or about 100 mm or less. The second major surface includes a second area that is different than the first curve, where the second area includes at least one of a two-dimensional surface area and a second curve. The support surface also includes a second support area that complements the second area of the second major surface.

As a further aspect of embodiments, the second area includes the second curve, the second curve having a second radius of curvature that is about 100 mm or more, about 200 mm or more, about 300 mm or more, about 400 mm or more, about 500 mm or more, about 600 mm or more, about 700 mm or more, about 800 mm or more, or about 900 mm or more.

According to an additional embodiment of this disclosure, a method of forming a curved glass article is provided. The method includes a step of applying a first adhesive with a first elongation to a first region of a frame or of a cover glass sheet, the frame having a support surface with a first curved surface in the first region. A step of molding the cover glass sheet to the frame is performed to conform the cover glass sheet to the support surface of the frame. Curing of the first adhesive at a first temperature for a first time period then occurs. The first curved surface includes a first radius of curvature, and the cover glass sheet includes a material having a first coefficient of thermal expansion. The frame includes a material having a second coefficient of thermal expansion. The material of the frame and the first adhesive satisfy one of the following conditions: (1) a ratio of the second coefficient of thermal expansion to the first coefficient of thermal expansion is less than 2, and the elongation first adhesive comprises an elongation of about 10% or less, and (2) the ratio of the second coefficient of thermal expansion to the first coefficient of thermal expansion is greater than or equal to 2, and the elongation is greater than 10%, greater than about 50%, greater than about 100%, or greater than or equal to about 200%.

As an aspect of the above method, the method further includes, after the curing step, cooling the curved glass article, and, after the cooling step, there is no visual deformation of the curved glass article as compared to before the curing step. A second adhesive may be applied to a second region of the frame or of the cover glass sheet, the second adhesive having a second elongation that is different than the first elongation.

According to one or more additional embodiments, a glass article includes a cover glass sheet having a first major surface and a second major surface, the second major surface having a first region with a first curve of a first radius of curvature, and a second region that is different than the first region. A frame with a support surface having a third region and a fourth region such that the third region conforms with the first region of the second major surface, and the fourth region conforms with the second region of the second major surface. A first adhesive is disposed between the first region of the support surface and the first region of the second major surface, and a second adhesive is disposed between the fourth region of the support surface and the second region of the second major surface. A curvature of the first region is higher than a curvature of the second region, and the first adhesive has a first Young's modulus and the second adhesive has a second Young's modulus that is less than the first Young's modulus.

In an aspect of the embodiment, the second region includes a second curve with a radius of curvature that is greater than the first radius of curvature, or the second region has no curvature. The first adhesive may have a first elongation, and the second adhesive a second elongation that is greater than the first elongation. In some embodiments, the first elongation is about 100% or less, about 50% or less, about 40% or less, about 30% or less, about 20% or less, or about 10% or less, and the second elongation is about 10% or more, about 20% or more, about 30% or more, about 40% or more, about 50% or more, about 60% or more, about 70% or more, about 80% or more, about 90% or more, about 100% or more, about 150% or more, about 200% or more, about 250% or more, or about 300% or more.

According to a further embodiment, a glass article is provided that includes a cover glass sheet having a first major surface and a second major surface, the second major surface including a first region with a first curve of a first radius of curvature, and a second region that is different than the first region. The article also includes a frame having a support surface with a third region comprised of a first frame material and a fourth region comprised of a second frame material that is different than the first frame material. The second major surface of the cover glass sheet faces the support surface of the frame, and the third region includes a second curve that complements the first curve and the fourth region complements the second region. A first adhesive is disposed between the third region of the support surface of the frame and the first region of the second major surface of the cover glass sheet, the first adhesive having a first Young's modulus. A second adhesive disposed between the fourth region of the support surface of the frame and the second region of the second major surface of the cover glass sheet, the second adhesive comprising a second Young's modulus that is different than the first Young's modulus.

As an aspect of the embodiment, the first frame material has a first coefficient of thermal expansion, and the second frame material comprises a second coefficient of thermal expansion. The first coefficient of thermal expansion is less than the second coefficient of thermal expansion. The cover glass sheet has a third coefficient of thermal expansion, and a ratio of the first coefficient of thermal expansion to the third coefficient of thermal expansion may be about 2 or less, about 1.5 or less, about 1, or about 0.5 to 1.5. In another aspect, a ratio of the second coefficient of thermal expansion to the third coefficient of thermal expansion is about 2 or more. The first frame material may include stainless steel, and the second frame material may include polycarbonate or ABS. The second adhesive can be an tape adhesive. As a further aspect, the fourth region comprises at least one of a flat region and a second curve having a second radius of curvature that is greater than the first radius of curvature. A display may be bonded to the frame using optically clear adhesive, wherein the display is bonded to the frame in the fourth region. In one or more embodiments, the display may be bonded to a major surface of the cover glass sheet.

In yet another embodiment, a glass article is provided that includes a cover glass sheet having a first major surface and a second major surface, the second major surface including a first region with a first curve of a first radius of curvature, and a second region being different than the first region. A frame includes a first support surface and a second support surface, the first support surface including a first frame material and conforming with the first region of the second major surface, and the second support surface including a second frame material and conforming with the second region of the second major surface. A first adhesive is disposed between the first support surface and the first region of the second major surface, and a second adhesive is disposed between the second support surface and the second region of the second major surface. The first frame material is different than the second frame material, and the first region has a higher curvature than the second region.

As an aspect of the embodiment, the first frame material may include a first coefficient of thermal expansion, and the second frame material may include a second coefficient of thermal expansion, where the first coefficient of thermal expansion is less than the second coefficient of thermal expansion.

EXAMPLES

Comparative Examples 1 through 3, and Examples 4 through 8 were carried out as discussed below and summarized in Table 1.

TABLE 1

Deformation of Reference S-shape part for different frame materials and adhesive materials.

| Example # | Structural Adhesive | Frame Material | Frame Thickness (mm) | Cure T (° C.) | Cure time (min) | Visual Observation | Max deformation from CAD Nominal (mm) Display Area | Max deformation from CAD Nominal (mm) Non-Display |
|---|---|---|---|---|---|---|---|---|
| 1 (Comparative) | 3M Scotch-WeldTM DP460 | Al 5032 H32 | 3.175 | 95 | 2 | Deformed heavily, both in display and non-display areas | 2.21 | −7.54 |
| 2 (Comparative) | 3M Scotch-WeldTM DP460 | Al 5032 H32 | 3.175 | 65 | 20 | Deformed, both in display and non-display areas | 1.06 | −3.19 |
| 3 (Comparative) | 3M Scotch-WeldTM DP460 | PC/ABS | — | 65 | 20 | Deformed very heavily, both in display and non-display areas | n/a | n/a |
| 4 | 3M Scotch-WeldTM DP460 | SS410 | 3.175 | 65 | 20 | No visual deformation | 0.20 | −0.65 |
| 5 | 3M Scotch-WeldTM DP460 | SS410 | 3.175 | 95 | 2 | Little deformation in non-display area | 0.39 | −1.16 |
| 6 | 3M Scotch-WeldTM DP460 | SS410 | 1.905 | 65 | 20 | No visual deformation | 0.81 | −0.35 |
| 7 | 3M Scotch-WeldTM DP460 | SS410 | 1.905 | 85 | 5 | Little deformation in non-display area | 0.46 | −1.60 |
| 8 | 3M VHB | PC/ABS | — | 65 | 20 | No visual deformation | n/a | n/a |

Comparative Example 1

In Comparative Example 1, a glass article was made using a reference product design frame (S-shape part with a concave surface having a radius of R150 mm and a convex surface of radius R250 mm) with 3.175 mm thick Aluminum 5032 H32 alloy. A chemically strengthened aluminosilicate cover glass sheet having a thickness of 0.55 mm was cold-formed and attached to a surface of the frame using a toughened two-part epoxy adhesive with a 2:1 mix ratio (ratio of base to accelerator) supplied by 3M, Inc. under the tradename 3M™ Scotch-Weld™ DP460. This adhesive has relatively high overlap shear strength of 4800 psi when cured at 49° C. for 3 hours and measured on an aluminum substrate using ASTM D 1002-72 standard. The adhesive is capable of holding a cold-formed 0.55 mm or 0.7 mm-thick glass (e.g., the chemically strengthened glass used in this example) having length and width dimensions of 91 mm×152 mm with an ink border of 0.25 inch—where the structural adhesive is only on the ink area—to a shape having a radius of curvature of R250 mm (in both the concave and convex directions). The cover glass sheet was cold-formed and attached to the frame material using the toughened epoxy adhesive in vacuum table process. The cover adhesive was cured at a temperature of 95° C. for 2 minutes. However, while the adhesive was able to hold the cold-formed glass on an aluminum curved substrate mold and pass environmental tests, severe deformation in samples were observed during the curing process. After curing, the sample was cooled to room temperature and heavy deformation was observed in the part, both in display area and non-display area. ATOS measurements were performed and maximum deformation from CAD nominal was 2.21 mm and −7.54 mm in display and non-display area, respectively.

Comparative Example 2

In a Comparative Example 2, the setup and materials used were the same as in Comparative Example 1, except that the curing of the part was performed at 65° C. for 20 min. After curing, the sample was cooled down to room temperature and heavy deformation was observed in the part, both in the display area and the non-display area. ATOS measurements were performed and maximum deformation from CAD nominal was 1.06 mm and −3.19 mm in display and non-display areas, respectively. In combination with Comparative Example 1, these show the effect of higher temperature curing on product deformation. Higher temperature during curing leads to large deformation due to CTE mismatches between materials (e.g., the glass and the frame).

Comparative Example 3

In a Comparative Example 3, the setup and materials used were the same as in Comparative Example 2, except that a frame of PC/ABS was used, a product design having an S-shape part with a concave surface of radius R65 mm and a convex surface of radius R150 mm was used, and the cover glass was a chemically strengthened aluminosilicate cover glass sheet having a 0.4 mm thickness. The adhesive was cured at a temperature of 65° C. for 20 minutes. After curing, the sample was cooled down to room temperature (e.g., about 20° C.) and heavy deformation was observed in the part, both in a display area and a non-display area. ATOS measurements are not available for Comparative Example 3. The heavy deformation is evidence that the very different CTEs (of glass versus aluminum in Example 2, and glass versus PC/ABS in Example 3) has a significant impact on product deformation.

Example 4

As an example of an embodiment of the present disclosure, a glass article was made using the reference product design frame of ferritic stainless steel 410. This frame substrate was chosen because it has a coefficient of thermal expansion (CTE) that is close to that of the chemically strengthened aluminosilicate cover glass sheet. For reference, the CTE of the cover glass sheet is 7.88 μm/m/° C. Regarding frame materials, the CTE of Aluminum (Al) 5052 H32 alloy is 23.8 μm/m/° C., of Mg AZ91D alloy is 25.2 μm/m/° C., of low carbon steel 1080 is 14.7 μm/m/° C., of Ferritic stainless steel SS410 is 9.9 μm/m/° C., and of PC/ABS is 67 μm/m/° C. The cover glass sheet used in this example had a thickness of 0.55 mm and was cold-formed and attached to the frame material using 3M™ Scotch-Weld™ DP460 toughened epoxy in vacuum table process. The adhesive was cured at a temperature of 65° C. for 20 minutes. After curing, the sample was cooled to room temperature and no visual deformation was observed in the part, neither in the display area nor the non-display area. ATOS measurements were performed and maximum deformation from CAD nominal was 0.20 mm and −0.65 mm in display and non-display areas, respectively. These numbers are within the spec tolerance of the reference product design frame.

Example 5

As an example of an embodiment of the present disclosure, Example 5 is similar to Example 4, except that curing was performed at 95° C. for 2 min. After curing, the sample was cooled to room temperature and no deformation was observed in display area while very little deformation was observed in non-display area. ATOS measurements were performed and maximum deformation from CAD nominal was 0.39 mm and −1.16 mm in display and non-display areas, respectively. This example can be compared to Example 5 and shows the effect of higher temperature curing on product deformation. Higher temperature during curing leads to larger deformation due to small CTE mismatches between materials (e.g., glass and frame).

Example 6

As an example of an embodiment of the present disclosure, Example 6 is similar to Example 4, except that the thickness of frame is 1.905 mm (vs. 3.125 mm in Example 4). After curing, the sample was cooled to room temperature and no deformation was observed. ATOS measurements were performed and maximum deformation from CAD nominal was 0.81 mm and −0.35 mm in display and non-display areas, respectively.

Example 7

As an example of an embodiment of the present disclosure, Example 7 is similar to Example 6, except that the curing was performed at 85° C. for 5 min. After curing, the sample was cooled to room temperature and no deformation was observed in display area, while little deformation was observed in non-display area. ATOS measurements were performed and maximum deformation from CAD nominal was 0.46 mm and −1.60 mm in display and non-display area, respectively.

Example 8

As an example of an embodiment of the present disclosure, Example 8 is similar to Example 4, except that the VHB adhesive was used. After curing, the sample was cooled to room temperature and no deformation was observed. This example could be compared to 4 and shows the effect of using low modulus, high elongation adhesives with materials that have large CTE mismatch (e.g., glass and PC/ABS).

FIG. 5 shows the ATOS data from the above Examples 1, 2, 4, 5, 6, and 7.

Figure 7:
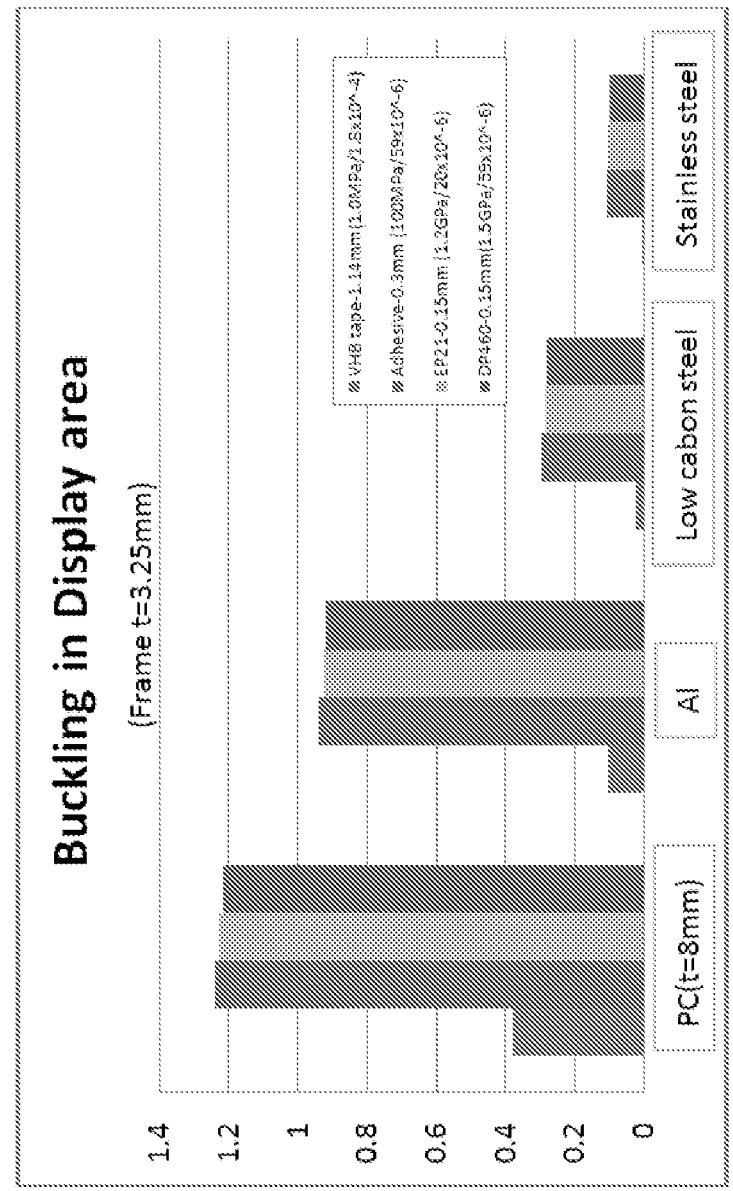
FIG. 7 shows data of deformation tests of a glass article according to one or more embodiments.
Figure 8:
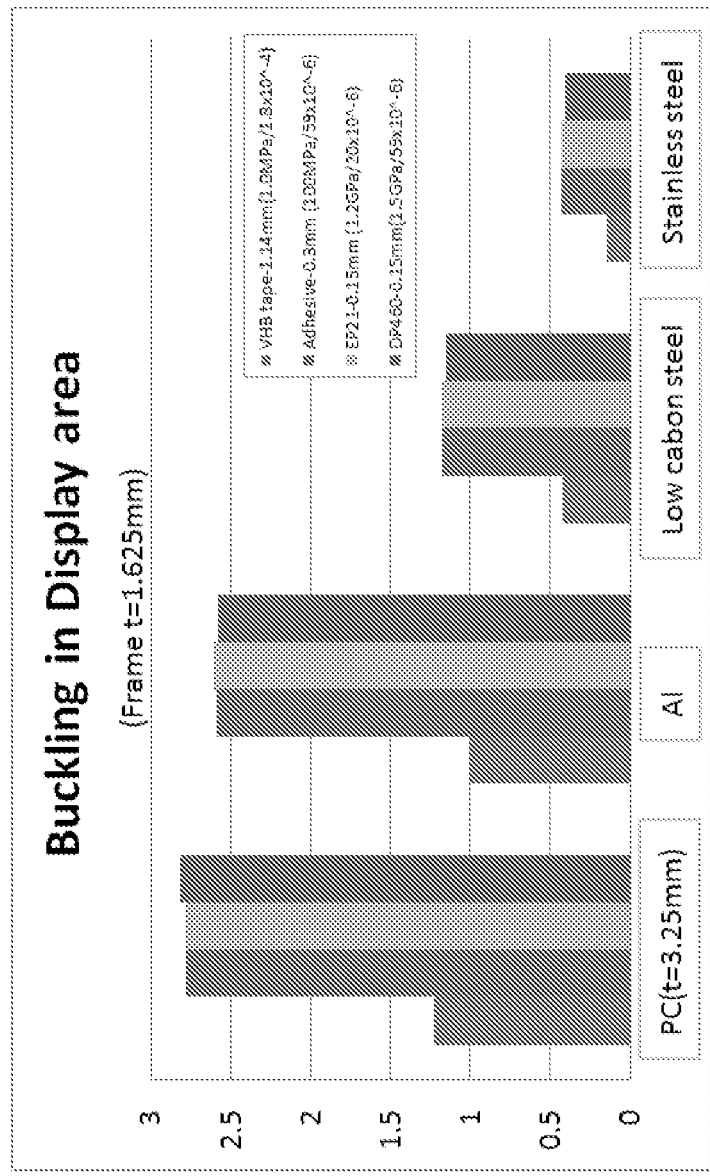
FIG. 8 shows data of deformation tests of a glass article according to one or more additional embodiments.

In addition to the above Examples 1 through 8, finite element analysis (FEA) simulations were performed to understand the interaction of frame and adhesive materials on product deformation. A model was developed for a flat part (with display opening in between), and simulations performed for different materials when temperature was changed from 100° C. to 20° C., as shown in FIG. 6. In all simulations, the thickness of cover glass was kept constant at 0.55 mm. The frame materials evaluated were PC/ABS having a thickness of 8 mm, Al5052 H32 alloy having a thickness of 3.25 mm or 1.625 mm, low carbon steel 1080 having a thickness of 3.25 mm or 1.625 mm, and ferritic stainless steel SS410 having a thickness of 3.25 mm or 1.625 mm. Table 2 and FIGS. 7 and 8 summarizes the data from these simulations.

disclosed herein allows for a more economical manufacturing process. In particular, the glass article is able to spend less time at an elevated temperature and under vacuum, which provides cost savings.

Strengthened Glass Properties

As noted above, glass substrate 16 may be strengthened. In one or more embodiments, glass substrate 16 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass substrate 16 may be strengthened mechanically by utilizing a mismatch of the coefficient of thermal expansion between portions of the article to create a compressive stress region and a central region exhibiting a tensile stress. In some embodiments, the glass substrate may be strengthened thermally by heating the glass to a temperature above the glass transition point and then rapidly quenching.

TABLE 2

Results for Deformation of flat part in Display Area with Different Frame Materials and Adhesive Materials.

| ΔT (100° C. to 20° C.) | | VHB tape, 1.14 mm thick (1.0 MPa/1.8 × 10$^{-4}$) | | | | Adhesive, 0.3 mm thick (100 MPa/59 × 10$^{-6}$) | | | |
|---|---|---|---|---|---|---|---|---|---|
| Frame thickness (mm) | Cross section in width | PC/ABS* | Al5052 H32 alloy | low carbon steel 1080 | Ferritic stainless steel SS410 | PC/ABS* | Al5052 H32 alloy | low carbon steel 1080 | ferritic stainless steel SS410 |
| 3.25 1.625 | Max buckling (mm) | 0.381 1.225 | 0.104 1.01 | 0.023 0.426 | 0.004 0.145 | 1.239 2.783 | 0.939 2.591 | 0.295 1.175 | 0.108 0.432 |

| ΔT (100° C. to 20° C.) | | EP21TDCHT-LO, 0.15 mm thick (1.2 GPa/20 × 10$^{-6}$ | | | | DP460, 0.15 mm thick (1.5 GPa/59 × 10$^{-6}$) | | | |
|---|---|---|---|---|---|---|---|---|---|
| Frame thickness (mm) | Cross section in width | PC/ABS* | Al5052 H32 alloy | low carbon steel 1080 | Ferritic stainless steel SS410 | PC/ABS* | Al5052 H32 alloy | low carbon steel 1080 | Ferritic stainless steel SS410 |
| 3.25 1.625 | Max buckling (mm) | 1.226 2.786 | 0.923 2.607 | 0.284 1.177 | 0.105 0.431 | 1.214 2.818 | 0.919 2.583 | 0.281 1.154 | 0.099 0.409 |

*PC/ABS fames had a thickness of 8 mm in all examples.

The above examples demonstrate how embodiments of this disclosure can provide improved glass articles that minimize deformation of 3D cold-bent glass products.

In particular embodiments, the glass substrate is bent to the curved shape within a mold (e.g., supported by a curved mold surface) via application of a force (e.g., via a vacuum chuck, electrostatic chuck, vacuum bag, a press, etc.). As disclosed herein, the curved shape is maintained initially using a first adhesive at an elevated temperature and for a relatively short time period to provide initial green strength (i.e., a level of strength that allows for processing and handling that is lower than the final bonding strength) to hold the curved shape of the glass substrate. Thereafter, the glass article is removed from the mold and a second adhesive is allowed to cure for an extended period of time at ambient temperature to provide a full structural bond between the glass substrate and frame. However, in embodiments, a single adhesive can be used if the adhesive has a first early cure strength and a late structural cure strength. A glass article formed using such a dual adhesive system as In various embodiments, glass substrate 16 may be chemically strengthened by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as Li$^+$, Na$^+$, K$^+$, Rb$^+$, and Cs$^+$. Alternatively, monovalent cations in the surface layer may be replaced with monovalent cations other than alkali metal cations, such as Ag$^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrates may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrate may be immersed in a molten mixed salt bath including from about 5% to about 90% $KNO_3$ and from about 10% to about 95% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by a single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate may be strengthened to exhibit a DOC that is described as a fraction of the thickness T1 of the glass substrate (as described herein). For example, in one or more embodiments, the DOC may be equal to or greater than about 0.05 T1, equal to or greater than about 0.1 T1, equal to or greater than about 0.11 T1, equal to or greater than about 0.12 T1, equal to or greater than about 0.13 T1, equal to or greater than about 0.14 T1, equal to or greater than about 0.15 T1, equal to or greater than about 0.16 T1, equal to or greater than about 0.17 T1, equal to or greater than about 0.18 T1, equal to or greater than about 0.19 T1, equal to or greater than about 0.2 T1, equal to or greater than about 0.21 T1. In some embodiments, the DOC may be in a range from about 0.08 T1 to about 0.25 T1, from about 0.09 T1 to about 0.25 T1, from about 0.18 T1 to about 0.25 T1, from about 0.11 T1 to about 0.25 T1, from about 0.12 T1 to about 0.25 T1, from about 0.13 T1 to about 0.25 T1, from about 0.14 T1 to about 0.25 T1, from about 0.15 T1 to about 0.25 T1, from about 0.08 T1 to about 0.24 T1, from about 0.08 T1 to about 0.23 T1, from about 0.08 T1 to about 0.22 T1, from about 0.08 T1 to about 0.21 T1, from about 0.08 T1 to about 0.2 T1, from about 0.08 T1 to about 0.19 T1, from about 0.08 T1 to about 0.18 T1, from about 0.08 T1 to about 0.17 T1, from about 0.08 T1 to about 0.16 T1, or from about 0.08 T1 to about 0.15 T1. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40

μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm. In other embodiments, DOC falls within any one of the exact numerical ranges set forth in this paragraph.

In one or more embodiments, the strengthened glass substrate may have a CS (which may be found at the surface or a depth within the glass substrate) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass substrate 16 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises SnO2 in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass substrate 134 may be made from any glass composition falling with any one of the exact numerical ranges discussed above.

Aspect (1) of this disclosure pertains to a glass article, comprising: a cover glass sheet having a first major surface and a second major surface, the second major surface comprising a first region comprising a first curve with a first radius of curvature, and a second region that is different than the first region; a frame having a support surface comprising a third region comprised of a first frame material and a fourth region comprised of a second frame material that is different than the first frame material, wherein the second major surface of the cover glass sheet faces the support surface of the frame, and wherein the third region comprising a second curve that complements the first curve and the fourth region complements the second region; a first adhesive disposed between the third region of the support surface of the frame and the first region of the second major surface of the cover glass sheet, the first adhesive comprising a first Young's modulus; and a second adhesive disposed between the fourth region of the support surface of the frame and the second region of the second major surface of the cover glass sheet, the second adhesive comprising a second Young's modulus that is different than the first Young's modulus.

Aspect (2) of this disclosure pertains to the glass article of Aspect (1), wherein the first frame material comprises a first coefficient of thermal expansion, and the second frame material comprises a second coefficient of thermal expansion.

Aspect (3) of this disclosure pertains to the glass article of Aspect (2), wherein the first coefficient of thermal expansion is less than the second coefficient of thermal expansion.

Aspect (4) of this disclosure pertains to the glass article of Aspect (2) or Aspect (3), wherein the cover glass sheet comprises a third coefficient of thermal expansion, and wherein a ratio of the first coefficient of thermal expansion to the third coefficient of thermal expansion is about 2 or less, about 1.5 or less, about 1, or about 0.5 to 1.5.

Aspect (5) of this disclosure pertains to the glass article of Aspect (3) or Aspect (4), wherein a ratio of the second coefficient of thermal expansion to the third coefficient of thermal expansion is about 2 or more.

Aspect (6) of this disclosure pertains to the glass article of any one of Aspects (1) through Aspect (5), wherein the first frame material comprises stainless steel.

Aspect (7) of this disclosure pertains to the glass article of any one of Aspects (1) through Aspect (6), wherein the second frame material comprises polycarbonate or ABS.

Aspect (8) of this disclosure pertains to the glass article of any one of Aspects (1) through Aspect (7), wherein the second adhesive is a tape adhesive.

Aspect (9) of this disclosure pertains to the glass article of any one of Aspects (1) through Aspect (8), wherein the fourth region comprises at least one of a flat region and a second curve having a second radius of curvature that is greater than the first radius of curvature.

Aspect (10) of this disclosure pertains to the glass article of any one of Aspects (1) through Aspect (9), further comprising a display bonded to the frame using optically clear adhesive.

Aspect (11) of this disclosure pertains to the glass article of Aspect (10), wherein the display is bonded to the frame in the fourth region.

Aspect (12) of this disclosure pertains to the glass article of any one of Aspects (1) through Aspect (11), wherein the cover glass sheet comprises a strengthened aluminosilicate glass composition.

Aspect (13) of this disclosure pertains to the glass article of any one of Aspects (1) through Aspect (12), wherein the cover glass sheet has a thickness of from 0.4 mm to 2.0 mm.

Aspect (14) of this disclosure pertains to the glass article of any one of Aspects (1) through Aspect (13), further comprising a surface treatment on the first major surface of the cover glass sheet.

Aspect (15) of this disclosure pertains to the glass article of Aspect (14), wherein the surface treatment is at least one of an anti-glare treatment, an anti-reflective coating, and easy-to-clean coating.

Aspect (16) of this disclosure pertains to the glass article of any one of Aspects (1) through Aspect (15), wherein the first and second curves each comprise at least one location having a radius of curvature of 100 mm or less.

Aspect (17) of this disclosure pertains to vehicle interior comprising the glass article according to any one of Aspects (1) through (16).

Aspect (18) pertains to a glass article comprising: a cover glass sheet having a first major surface and a second major surface, the second major surface comprising a first region comprising a first curve with a first radius of curvature, and a second region that is different than the first region; a frame comprising a first support surface and a second support surface, the first support surface comprising a first frame material and conforming with the first region of the second major surface, and the second support surface comprising a second frame material and conforming with the second region of the second major surface, a first adhesive disposed between the first support surface and the first region of the second major surface; and a second adhesive disposed between the second support surface and the second region of the second major surface, wherein the first frame material is different than the second frame material, and wherein the first region comprises a higher curvature than the second region.

Aspect (19) pertains to the glass article of Aspect (18), wherein the first frame material comprises a first coefficient of thermal expansion, and the second frame material comprises a second coefficient of thermal expansion.

Aspect (20) pertains to the glass article of Aspect (19), wherein the first coefficient of thermal expansion is less than the second coefficient of thermal expansion.

Aspect (21) pertains to the glass article of Aspect (19) or Aspect (20), wherein the cover glass sheet comprises a third coefficient of thermal expansion, and wherein a ratio of the first coefficient of thermal expansion to the third coefficient of thermal expansion is about 2 or less, about 1.5 or less, about 1, or about 0.5 to 1.5.

Aspect (22) pertains to the glass article of Aspect (20) or Aspect (21), wherein a ratio of the second coefficient of thermal expansion to the third coefficient of thermal expansion is about 2 or more.

Aspect (23) pertains to the glass article of any one of Aspects (18) through (22), wherein the first adhesive comprises a first Young's modulus, and the second adhesive comprises a second Young's modulus that is less than the first Young's modulus.

Aspect (24) pertains to the glass article of any one of Aspects (18) through (23), wherein the first adhesive comprises a first elongation and the second adhesive comprises a second elongation that is greater than the first elongation Aspect (25) pertains to the glass article of Aspect (24), wherein the first elongation is about 100% or less, about 50% or less, about 40% or less, about 30% or less, about 20% or less, or about 10% or less.

Aspect (26) pertains to the glass article of Article (24) or Article (25), wherein the second elongation is about 10% or more, about 20% or more, about 30% or more, about 40% or more, about 50% or more, about 60% or more, about 70% or more, about 80% or more, about 90% or more, about 100% or more, about 150% or more, about 200% or more, about 250% or more, or about 300% or more.

Aspect (27) pertains to the glass article of any one of Aspects (18) through (23), wherein the first frame material comprises stainless steel.

Aspect (28) pertains to the glass article of any one of Aspects (18) through (27), wherein the second frame material comprises polycarbonate or ABS.

Aspect (29) pertains to the glass article of any one of Aspects (18) through (28), wherein the second adhesive is a tape adhesive.

Aspect (30) pertains to the glass article of any one of Aspects (18) through (29), wherein the fourth region comprises at least one of a flat region and a second curve having a second radius of curvature that is greater than the first radius of curvature.

Aspect (31) pertains to the glass article of any one of Aspects (18) through (30), further comprising a display bonded to the frame using optically clear adhesive.

Aspect (32) pertains to the glass article of Article (31), wherein the display is bonded to the frame in the fourth region.

Aspect (33) pertains to the glass article of any one of Aspects (18) through (32), wherein the cover glass sheet comprises a strengthened aluminosilicate glass composition.

Aspect (34) pertains to the glass article of any one of Aspects (18) through (33), wherein the cover glass sheet has a thickness of from 0.4 mm to 2.0 mm.

Aspect (35) pertains to the glass article of any one of Aspects (18) through (34), further comprising a surface treatment on the first major surface of the cover glass sheet.

Aspect (36) pertains to the glass article of Aspect (35), wherein the surface treatment is at least one of an anti-glare treatment, an anti-reflective coating, and easy-to-clean coating.

Aspect (37) pertains to the glass article of any one of Aspects (18) through (36), wherein the first and second curves each comprise at least one location having a radius of curvature of 100 mm or less.

Aspect (38) pertains to a vehicle interior comprising the glass article according to any one of Aspects (18) through (37).

Aspect (39) pertains to a glass article, comprising: a cover glass sheet having a first major surface and a second major surface, the second major surface comprising a first curve having a first radius of curvature and a second curve having a second radius of curvature that is different than the first radius of curvature; a frame having a support surface comprising a third curve and a fourth curve, wherein the second major surface of the cover glass sheet faces the support surface of the frame and wherein the third curve complements the first curve and the fourth curve complements the second curve; a first adhesive disposed between the third curve of the support surface of the frame and the first curve of the second major surface of the cover glass sheet, the first adhesive comprising a first elongation; and a second adhesive disposed between the fourth curve of the support surface of the frame and the second curve of the second major surface of the cover glass sheet, the second adhesive comprising a second elongation that is different than the first elongation.

Aspect (40) pertains to the glass article of Aspect (39), wherein the first adhesive comprises a first Young's modulus and the second adhesive comprises a second Young's modulus that is different than the first Young's modulus.

Aspect (41) pertains to the glass article of Aspect (39) or (40), wherein the first radius of curvature is less than the second radius of curvature, and wherein first elongation is less than the second elongation.

Aspect (42) pertains to the glass article of Aspect (40) or (41), wherein the first Young's modulus is greater than the second Young's modulus.

Aspect (43) pertains to the glass article of any one of Aspects (39) through (42), wherein the first elongation is about 100% or less, about 50% or less, about 40% or less, about 30% or less, about 20% or less, or about 10% or less.

Aspect (44) pertains to the glass article of any one of Aspects (39) through (43), wherein the second elongation is about 10% or more, about 20% or more, about 30% or more, about 40% or more, about 50% or more, about 60% or more, about 70% or more, about 80% or more, about 90% or more, about 100% or more, about 150% or more, about 200% or more, about 250% or more, or about 300% or more.

Aspect (45) pertains to the glass article of any one of Aspects (39) through (44), wherein the cover glass sheet comprises a material having a first coefficient of thermal expansion, and the frame comprises a material having a second coefficient of thermal expansion.

Aspect (46) pertains to the glass article of Aspect (45), wherein a ratio of the second coefficient of thermal expansion to the first coefficient of thermal expansion is less than 2, and the first adhesive comprises an elongation of about 10% or less.

Aspect (47) pertains to the glass article of any one of Aspects (45) or (46), wherein the ratio of the second coefficient of thermal expansion to the first coefficient of thermal expansion is greater than or equal to 2, and the elongation of the first adhesive is greater than 10%, greater than about 50%, greater than about 100%, or greater than or equal to about 200%.

Aspect (48) pertains to the glass article of any one of Aspects (39) through (47), wherein the material of the frame comprises a metal, an alloy, or a polymer.

Aspect (49) pertains to the glass article of Aspect (48), wherein the material of the frame comprises at least one of stainless steel, polycarbonate (PC), acrylnitrile-butadiene-styrene (ABS), or magnesium alloy.

Aspect (50) pertains to the glass article of any one of Aspects (39) through (49), wherein at least one of the first adhesive and the second adhesive comprise toughened epoxy, acrylic, urethane, or silicone.

Aspect (51) pertains to the glass article of any one of Aspects (39) through (50), wherein the first radius of curvature is about 600 mm or less, about 500 mm or less, about 400 mm or less, about 300 mm or less, about 250 mm or less, about 200 mm or less, or about 100 mm or less.

Aspect (52) pertains to the glass article of any one of Aspects (39) through (51), wherein the second radius of curvature is about 100 mm or more, about 200 mm or more, about 300 mm or more, about 400 mm or more, about 500 mm or more, about 600 mm or more, about 700 mm or more, about 800 mm or more, or about 900 mm or more.

Aspect (53) pertains to the glass article of any one of Aspects (39) through (52), wherein the second curve has a curvature of zero.

Aspect (54) pertains to the glass article of any one of Aspects (39) through (53), wherein the material of the frame and the first adhesive satisfy one of the following conditions: (1) a ratio of the second coefficient of thermal expansion to the first coefficient of thermal expansion is less than 2, and the first adhesive comprises an elongation of about 10% or less, and (2) the ratio of the second coefficient of thermal expansion to the first coefficient of thermal expansion is greater than or equal to 2, and the elongation of the first adhesive is greater than 10%, greater than about 50%, greater than about 100%, or greater than or equal to about 200%.

Aspect (55) pertains to the glass article of any one of Aspects (39) through (54), further comprising a display bonded to the frame using optically clear adhesive.

Aspect (56) pertains to a vehicle interior comprising the glass article according to any one of Aspects (39) through (55).

Aspect (57) pertains to a glass article, comprising: a cover glass sheet having a first major surface and a second major surface, the second major surface comprising a first curve having a first radius of curvature, the cover glass sheet comprising a material having a first coefficient of thermal expansion; a frame having a support surface comprising a second curve, wherein the second major surface of the cover glass sheet faces the support surface of the frame and wherein the second curve complements the first curve, the frame comprising a material having a second coefficient of thermal expansion; and a first adhesive disposed between the support surface of the frame and the second major surface of the cover glass sheet, wherein the material of the frame and the first adhesive satisfy one of the following conditions: (1) a ratio of the second coefficient of thermal expansion to the first coefficient of thermal expansion is less than 2, and the first adhesive comprises an elongation of about 10% or less, and (2) the ratio of the second coefficient of thermal expansion to the first coefficient of thermal expansion is greater than or equal to 2, and the elongation of the first adhesive is greater than 10%, greater than about 50%, greater than about 100%, or greater than or equal to about 200%.

Aspect (58) pertains to the glass article of Aspect (57), wherein the ratio of the second coefficient of thermal expansion to the first coefficient of thermal expansion is less than 2, and the first adhesive comprises an elongation of about 10% or less, and wherein the first radius of curvature is about 600 mm or less, about 500 mm or less, about 400 mm or less, about 300 mm or less, about 250 mm or less, about 200 mm or less, or about 100 mm or less.

Aspect (59) pertains to the glass article of Aspect (57) or (58), wherein the second major surface comprises a second area that is different than the first curve, the second area comprises at least one of a two-dimensional surface area and a second curve, and wherein the support surface comprises a second support area that complements the second area of the second major surface.

Aspect (60) pertains to the glass article of Aspect (59), wherein the second area comprises the second curve, the second curve having a second radius of curvature that is about 100 mm or more, about 200 mm or more, about 300 mm or more, about 400 mm or more, about 500 mm or more, about 600 mm or more, about 700 mm or more, about 800 mm or more, or about 900 mm or more.

Aspect (61) pertains to the glass article of any one of Aspects (57) through (60), wherein the first adhesive comprises toughened epoxy, acrylic, urethane, or silicone.

Aspect (62) pertains to the glass article of any one of Aspects (57) through (61), further comprising a second adhesive disposed between the second area of the second major surface, the second adhesive being different than the first adhesive.

Aspect (63) pertains to the glass article of Aspect (62), wherein the second adhesive comprising a second elongation that is different than the first elongation Aspect (64) pertains to the glass article of Aspect (62) or (63), wherein the first adhesive comprises a first Young's modulus and the second adhesive comprises a second Young's modulus that is different than the first Young's modulus.

Aspect (65) pertains to a vehicle interior comprising the glass article according to any one of Aspects (57) through (64).

Aspect (66) pertains to a method of forming a curved glass article, comprising the steps of: applying a first adhesive with a first elongation to a first region of a frame or of a cover glass sheet, the frame comprising a support surface with a first curved surface in the first region; molding the cover glass sheet to the frame so as to conform the cover glass sheet to the support surface of the frame; and curing the first adhesive at a first temperature for a first time period, wherein the first curved surface comprises a first radius of curvature, wherein the cover glass sheet comprising a material having a first coefficient of thermal expansion, the frame comprises a material having a second coefficient of thermal expansion, and the first adhesive comprises a first elongation, and wherein the material of the frame and the first adhesive satisfy one of the following conditions: (1) a ratio of the second coefficient of thermal expansion to the first coefficient of thermal expansion is less than 2, and the elongation first adhesive comprises an elongation of about 10% or less, and (2) the ratio of the second coefficient of thermal expansion to the first coefficient of thermal expansion is greater than or equal to 2, and the elongation is greater than 10%, greater than about 50%, greater than about 100%, or greater than or equal to about 200%.

Aspect (67) pertains to the method of Aspect (66), further comprising, after the curing step, cooling the curved glass article, wherein, after the cooling step, there is no visual deformation of the curved glass article as compared to before the curing step.

Aspect (68) pertains to the method of Aspect (66) or Aspect (67), further comprising applying a second adhesive to a second region of the frame or of the cover glass sheet, the second adhesive comprising a second elongation that is different than the first elongation.

Aspect (69) pertains to the method of Aspect (68), wherein the second region of the frame is flat or comprises a second curve with a second radius of curvature that is larger than the first radius of curvature, and the second elongation is greater than the first elongation.

Aspect (70) pertains to the method of Aspect (69), wherein the first adhesive comprises a first Young's modulus and the second adhesive comprises a second Young's modulus that is different than the first Young's modulus.

Aspect (71) pertains to the method of any one of Aspects (68) through (70), wherein the first elongation is about 100% or less, about 50% or less, about 40% or less, about 30% or less, about 20% or less, or about 10% or less.

Aspect (72) pertains to the method of any one of Aspects (68) through (71), wherein the second elongation is about 10% or more, about 20% or more, about 30% or more, about 40% or more, about 50% or more, about 60% or more, about 70% or more, about 80% or more, about 90% or more, about 100% or more, about 150% or more, about 200% or more, about 250% or more, or about 300% or more.

Aspect (73) pertains to the method of any one of Aspects (66) through (72), wherein the cover glass sheet comprises a material having a first coefficient of thermal expansion, and the frame comprises a material having a second coefficient of thermal expansion.

Aspect (74) pertains to the method of any one of Aspects (66) through (73), wherein the ratio of the second coefficient of thermal expansion to the first coefficient of thermal expansion is greater than or equal to 2, and elongation of the first adhesive is greater than 10%, greater than about 50%, greater than about 100%, or greater than or equal to about 200%.

Aspect (75) pertains to the method of any one of Aspects (66) through (74), wherein the material of the frame comprises a metal, an alloy, or a polymer.

Aspect (76) pertains to the method of Aspect (75), wherein the material of the frame comprises at least one of stainless steel, polycarbonate (PC), acrylnitrile-butadiene-styrene (ABS), or magnesium alloy.

Aspect (77) pertains to the method of any one of Aspects (66) through (76), wherein at least one of the first adhesive and the second adhesive comprise toughened epoxy, acrylic, urethane, or silicone.

Aspect (78) pertains to the method of any one of Aspects (66) through (77), wherein the second radius of curvature is about 100 mm or more, about 200 mm or more, about 300 mm or more, about 400 mm or more, about 500 mm or more, about 600 mm or more, about 700 mm or more, about 800 mm or more, or about 900 mm or more.

Aspect (79) pertains to the method of any one of Aspects (66) through (78), further comprising a display bonded to the frame using optically clear adhesive.

Aspect (80) pertains to the method of any one of Aspects (66) through (79), wherein the first and second curves each comprise at least one location having a radius of curvature of 100 mm or less.

Aspect (81) pertains to the method of any one of Aspects (66) through (80), wherein the step of molding comprises vacuum molding the cover glass sheet to the frame.

Aspect (82) pertains to the method of any one of Aspects (66) through (81), wherein the cover glass sheet comprises a chemically strengthened aluminosilicate glass composition.

Aspect (83) pertains to the method of any one of Aspects (66) through (82), wherein the cover glass sheet has a thickness of from 0.4 mm to 2.0 mm.

Aspect (84) pertains to a glass article comprising: a cover glass sheet having a first major surface and a second major surface, the second major surface comprising a first region comprising a first curve with a first radius of curvature, and a second region that is different than the first region; a frame having a support surface comprising a third region and a fourth region, the third region conforming with the first region of the second major surface, and the fourth region conforming with the second region of the second major surface, a first adhesive disposed between the first region of the support surface and the first region of the second major surface; and a second adhesive disposed between the fourth region of the support surface and the second region of the second major surface, wherein a curvature of the first region is higher than a curvature of the second region, and wherein the first adhesive comprises a first Young's modulus, and the second adhesive comprises a second Young's modulus that is less than the first Young's modulus.

Aspect (85) pertains to the glass article of Aspect (84), wherein the second region comprises a second curve with a radius of curvature that is greater than the first radius of curvature, or wherein the second region has no curvature.

Aspect (86) pertains to the glass article of Aspect (84) or Aspect (85), wherein the first adhesive comprises a first elongation, and the second adhesive comprises a second elongation that is greater than the first elongation.

Aspect (87) pertains to the glass article of Aspect (86), wherein the first elongation is about 100% or less, about 50% or less, about 40% or less, about 30% or less, about 20% or less, or about 10% or less.

Aspect (88) pertains to the glass article of Aspect (86) or (87), wherein the second elongation is about 10% or more, about 20% or more, about 30% or more, about 40% or more, about 50% or more, about 60% or more, about 70% or more, about 80% or more, about 90% or more, about 100% or more, about 150% or more, about 200% or more, about 250% or more, or about 300% or more.

Aspect (89) pertains to the glass article of any one of Aspects (84) through (88), wherein the material of the frame comprises a metal, an alloy, or a polymer.

Aspect (90) pertains to the glass article of Aspect (89), wherein the material of the frame comprises at least one of stainless steel, polycarbonate (PC), acrylnitrile-butadiene-styrene (ABS), or magnesium alloy.

Aspect (91) pertains to the glass article of any one of Aspects (84) through (90), wherein at least one of the first adhesive and the second adhesive comprise toughened epoxy, acrylic, urethane, or silicone.

Aspect (92) pertains to the glass article of any one of Aspects (84) through (91), wherein the first curve has a radius of curvature is about 600 mm or less, about 500 mm or less, about 400 mm or less, about 300 mm or less, about 250 mm or less, about 200 mm or less, or about 100 mm or less.

Aspect (93) pertains to the glass article of any one of Aspects (85) through (92), wherein the second curve has a radius of curvature is about 100 mm or more, about 200 mm or more, about 300 mm or more, about 400 mm or more, about 500 mm or more, about 600 mm or more, about 700 mm or more, about 800 mm or more, or about 900 mm or more.

Aspect (94) pertains to the glass article of any one of Aspects (84) through (93), further comprising a display bonded to the frame using optically clear adhesive.

Aspect (95) pertains to the glass article of any one of Aspects (84) through (94), wherein the first and second curves each comprise at least one location having a radius of curvature of 100 mm or less.

Aspect (96) pertains to a vehicle interior comprising the glass article according to any one of Aspects (84) through (95).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:
1. A glass article, comprising:
a cover glass sheet having a first major surface and a second major surface, the second major surface com- prising a first region comprising a first curve with a first radius of curvature, and a second region that is different than the first region;

a frame having a support surface comprising a third region comprised of a first frame material and a fourth region comprised of a second frame material that is different than the first frame material, wherein the second major surface of the cover glass sheet faces the support surface of the frame, and wherein the third region comprising a second curve that complements the first curve and the fourth region complements the second region;

a first adhesive disposed between the third region of the support surface of the frame and the first region of the second major surface of the cover glass sheet, the first adhesive comprising a first Young's modulus; and a second adhesive disposed between the fourth region of the support surface of the frame and the second region of the second major surface of the cover glass sheet, the second adhesive comprising a second Young's modulus that is different than the first Young's modulus, wherein the first frame material comprises a first coefficient of thermal expansion, and the second frame material comprises a second coefficient of thermal expansion, wherein the first coefficient of thermal expansion is less than the second coefficient of thermal expansion.

2. The glass article of claim 1, wherein the cover glass sheet comprises a third coefficient of thermal expansion, and
wherein a ratio of the first coefficient of thermal expansion to the third coefficient of thermal expansion is about 2 or less.

3. The glass article of claim 2, wherein a ratio of the second coefficient of thermal expansion to the third coefficient of thermal expansion is about 2 or more.

4. The glass article of claim 1, wherein the fourth region comprises at least one of a flat region and a second curve having a second radius of curvature that is greater than the first radius of curvature.

5. The glass article of claim 1, further comprising a display bonded to the frame or cover glass sheet using optically clear adhesive.

6. The glass article of claim 1, wherein:
the cover glass sheet is cold-bent in the first region,
the first region has a higher curvature of the second region, and
the first Young's modulus is greater than the second Young's modulus.

7. A glass article comprising:
a cover glass sheet having a first major surface and a second major surface, the second major surface comprising a first region comprising a first curve with a first radius of curvature, and a second region that is different than the first region;

a frame comprising a first support surface and a second support surface, the first support surface comprising a first frame material and conforming with the first region of the second major surface, and the second support surface comprising a second frame material and conforming with the second region of the second major surface, a first adhesive disposed between the first support surface and the first region of the second major surface; and a second adhesive disposed between the second support surface and the second region of the second major surface, wherein the first frame material is different than the second frame material, and wherein the first region comprises a higher curvature than the second region, wherein the first frame material comprises a first coefficient of thermal expansion, and the second frame material comprises a second coefficient of thermal expansion, wherein the first coefficient of thermal expansion is less than the second coefficient of thermal expansion.

8. The glass article of claim 7, wherein the cover glass sheet comprises a third coefficient of thermal expansion, and
wherein a ratio of the first coefficient of thermal expansion to the third coefficient of thermal expansion is about 2 or less, about 1.5 or less, about 1, or about 0.5 to 1.5.

9. The glass article of claim 8, wherein a ratio of the second coefficient of thermal expansion to the third coefficient of thermal expansion is about 2 or more.

10. The glass article of claim 7, wherein the first adhesive comprises a first Young's modulus, and the second adhesive comprises a second Young's modulus that is less than the first Young's modulus.

11. The glass article of claim 7, wherein the first adhesive comprises a first elongation and the second adhesive comprises a second elongation that is greater than the first elongation.

12. The glass article of claim 7, wherein the fourth region comprises at least one of a flat region and a second curve having a second radius of curvature that is greater than the first radius of curvature.

13. The glass article of claim 7, further comprising a display bonded to the frame or cover glass sheet optically clear adhesive.

14. The glass article of claim 7, wherein:
the cover glass sheet is cold-bent in the first region,
a first Young's modulus of the first adhesive is greater than a second Young's modulus of the second adhesive.

* * * * *